US011148605B2

(12) United States Patent
Buchholtz Storm et al.

(10) Patent No.: US 11,148,605 B2
(45) Date of Patent: Oct. 19, 2021

(54) CARGO CARRIER

(71) Applicant: Thule Sweden AB, Hillerstorp (SE)

(72) Inventors: Søren Buchholtz Storm, Odense SØ (DK); Günther Fritsche, Postbauer (DE); Henrik Eriksson, Jönköping (SE); Markus Nordangård, Värnamo (SE); Joakim Andersson, Anderstorp (SE); John-Patrik Treptow, Anderstorp (SE)

(73) Assignee: Thule Sweden AB, Hillerstorp (SE)

( * ) Notice: Subject to any disclaimer, the term of this patent is extended or adjusted under 35 U.S.C. 154(b) by 0 days.

(21) Appl. No.: 17/257,166

(22) PCT Filed: Sep. 2, 2019

(86) PCT No.: PCT/EP2019/073337
§ 371 (c)(1),
(2) Date: Dec. 30, 2020

(87) PCT Pub. No.: WO2020/043921
PCT Pub. Date: Mar. 5, 2020

(65) Prior Publication Data
US 2021/0178979 A1 Jun. 17, 2021

(30) Foreign Application Priority Data
Aug. 31, 2018 (EP) ..................... 18192055

(51) Int. Cl.
B60R 9/055 (2006.01)
(52) U.S. Cl.
CPC .................. B60R 9/055 (2013.01)

(58) Field of Classification Search
CPC ................. B60R 9/055; B60R 9/065
See application file for complete search history.

(56) References Cited

U.S. PATENT DOCUMENTS 3,008,784 A * 11/1961 Allard .................... B60R 9/055
312/198
4,420,105 A * 12/1983 Nepper .................. B60R 9/055
220/843

(Continued)

FOREIGN PATENT DOCUMENTS

| DE | 10056041 A1 | 5/2002 |
| DE | 10243091 A1 | 4/2004 |
| WO | 2012074307 A2 | 6/2012 |

OTHER PUBLICATIONS

International Search Report and Written Opinion of the International Searching Authority in International Application No. PCT/EP2019/073337, dated Oct. 4, 2019 (8 pages).

Primary Examiner — Justin M Larson
(74) Attorney, Agent, or Firm — Sterne, Kessler, Goldstein & Fox P.L.L.C.

(57) ABSTRACT

The invention concerns a cargo carrier comprising abase having a trough shape with an interior space for stowing goods to be transported therein and an openable and closable lid hingedly coupled with the base. The cargo carrier further comprises an add-on portion attached to at least one of the base and the lid, wherein the add-on portion enlarges the overall external volume of the cargo carrier. The invention further concerns a method for manufacturing such a cargo carrier.

20 Claims, 12 Drawing Sheets

(56) References Cited

U.S. PATENT DOCUMENTS

| | | | | |
|---|---|---|---|---|
| 4,433,804 A * | 2/1984 | Bott | ................ | B60R 9/055 |
| | | | | 224/321 |
| 4,867,361 A * | 9/1989 | Burnham | ................ | B60R 9/055 |
| | | | | 224/310 |
| 5,285,942 A * | 2/1994 | Wills | ................ | A63C 11/026 |
| | | | | 220/4.22 |
| 5,415,333 A * | 5/1995 | Wills | ................ | A63C 11/026 |
| | | | | 224/309 |
| 5,667,116 A * | 9/1997 | Reinhart | ................ | B60R 9/055 |
| | | | | 224/315 |
| 5,799,848 A * | 9/1998 | Wills | ................ | A63C 11/026 |
| | | | | 224/328 |
| 6,234,371 B1 * | 5/2001 | Sinn | ................ | B60R 9/055 |
| | | | | 224/328 |
| 7,004,365 B2 * | 2/2006 | Ingram | ................ | B60R 7/14 |
| | | | | 220/23.91 |
| 7,144,070 B2 * | 12/2006 | Wiebe | ................ | B60J 7/1621 |
| | | | | 296/185.1 |
| 7,237,826 B2 * | 7/2007 | Sagi | ................ | B60R 9/055 |
| | | | | 220/4.12 |
| 7,699,372 B2 * | 4/2010 | Adams | ................ | B60R 9/055 |
| | | | | 296/26.07 |
| 8,622,266 B2 * | 1/2014 | McMillan | ................ | B60R 9/0485 |
| | | | | 224/323 |
| 8,905,279 B2 * | 12/2014 | Hubbard | ................ | B60R 9/055 |
| | | | | 224/328 |
| D774,442 S * | 12/2016 | Adler | ................ | D12/413 |
| D786,771 S * | 5/2017 | Eriksson | ................ | D12/413 |
| 9,688,210 B2 * | 6/2017 | Fritsche | ................ | B60R 9/055 |
| D806,638 S * | 1/2018 | Adler | ................ | D12/413 |
| D806,639 S * | 1/2018 | Eriksson | ................ | D12/413 |
| D821,958 S * | 7/2018 | Adler | ................ | D12/413 |
| D822,580 S * | 7/2018 | Eriksson | ................ | D12/413 |
| 10,106,098 B2 * | 10/2018 | Tuyluce | ................ | E05C 9/026 |
| 10,118,564 B2 * | 11/2018 | Clark | ................ | B60R 9/05 |
| D863,203 S * | 10/2019 | Eriksson | ................ | D12/413 |
| 10,464,497 B2 * | 11/2019 | Kondo | ................ | B60R 9/055 |
| D868,673 S * | 12/2019 | Eriksson | ................ | D12/413 |
| 2017/0101229 A1 | 4/2017 | Perek | | |

* cited by examiner

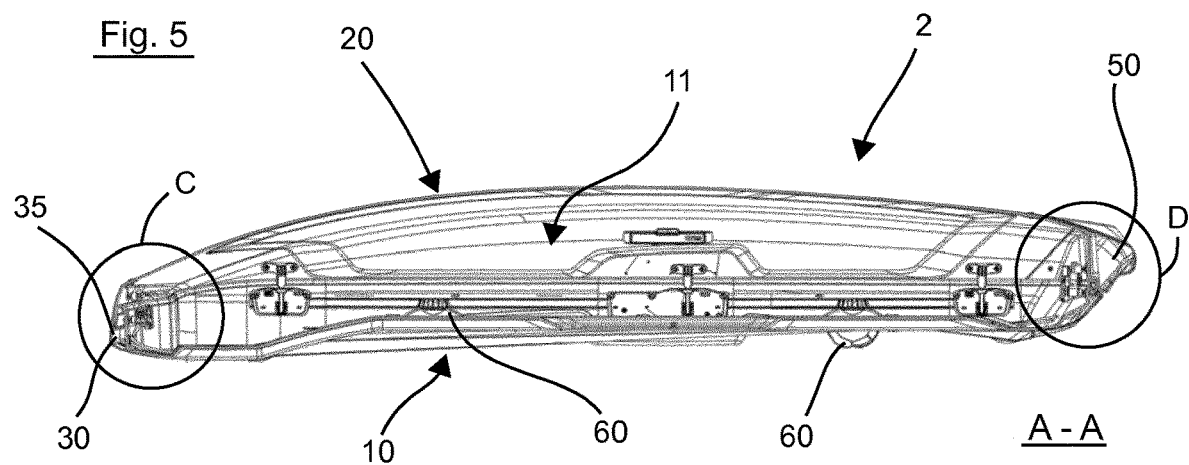
Fig. 5
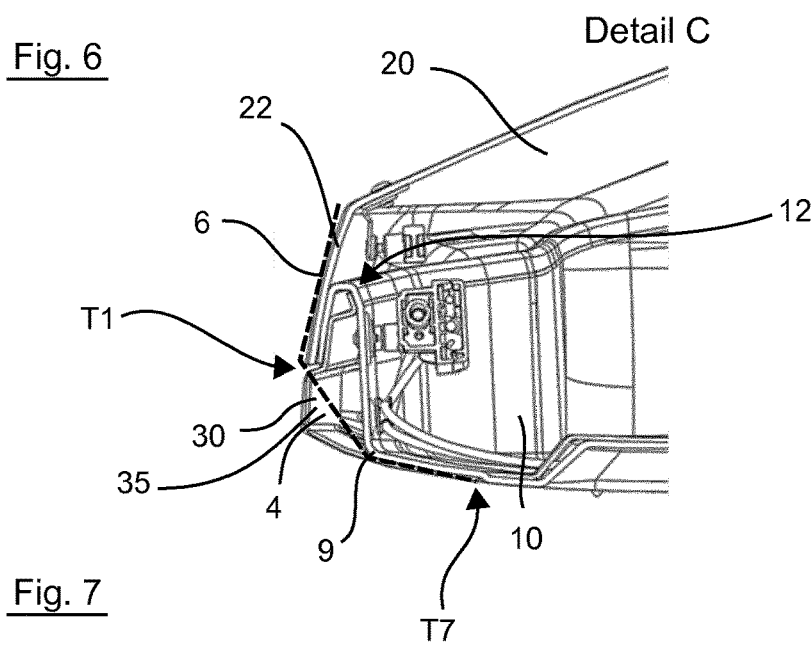
Fig. 6  Detail C
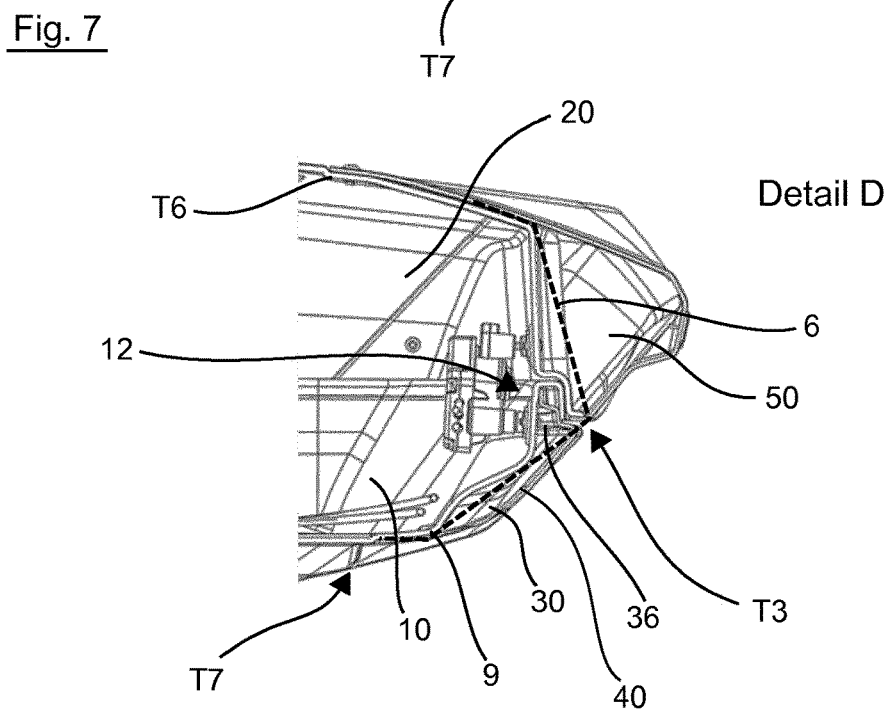
Fig. 7  Detail D

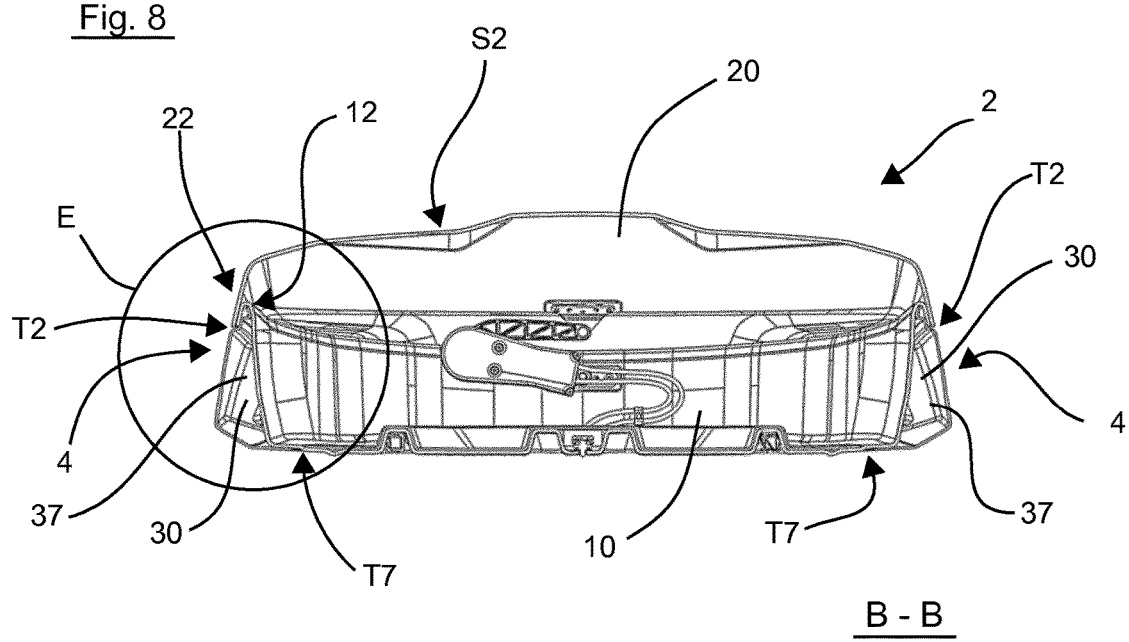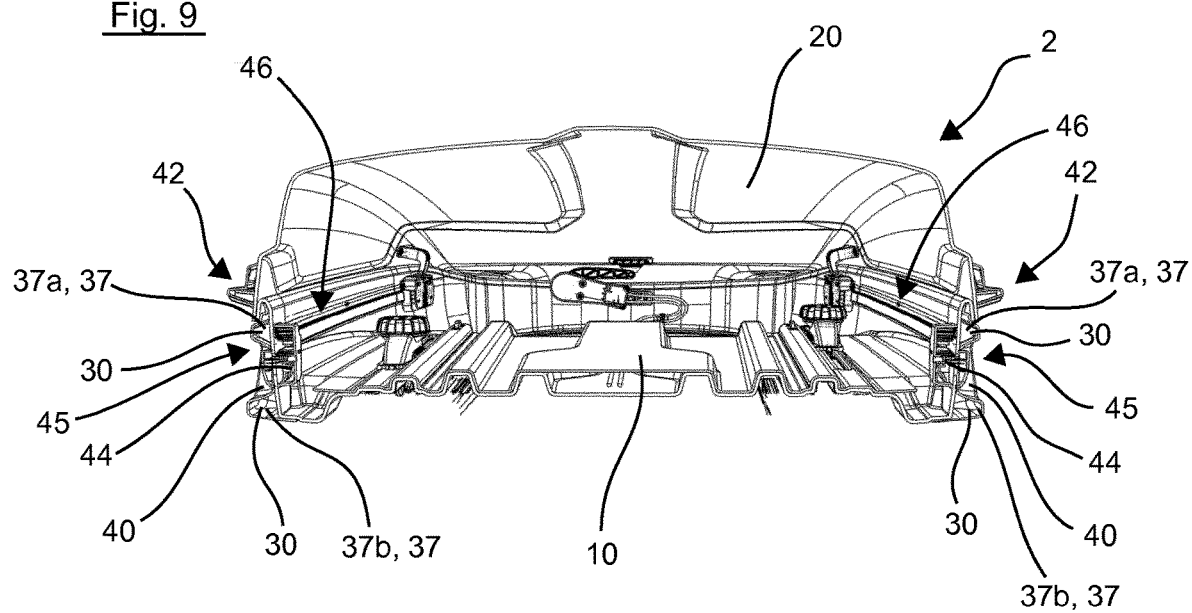

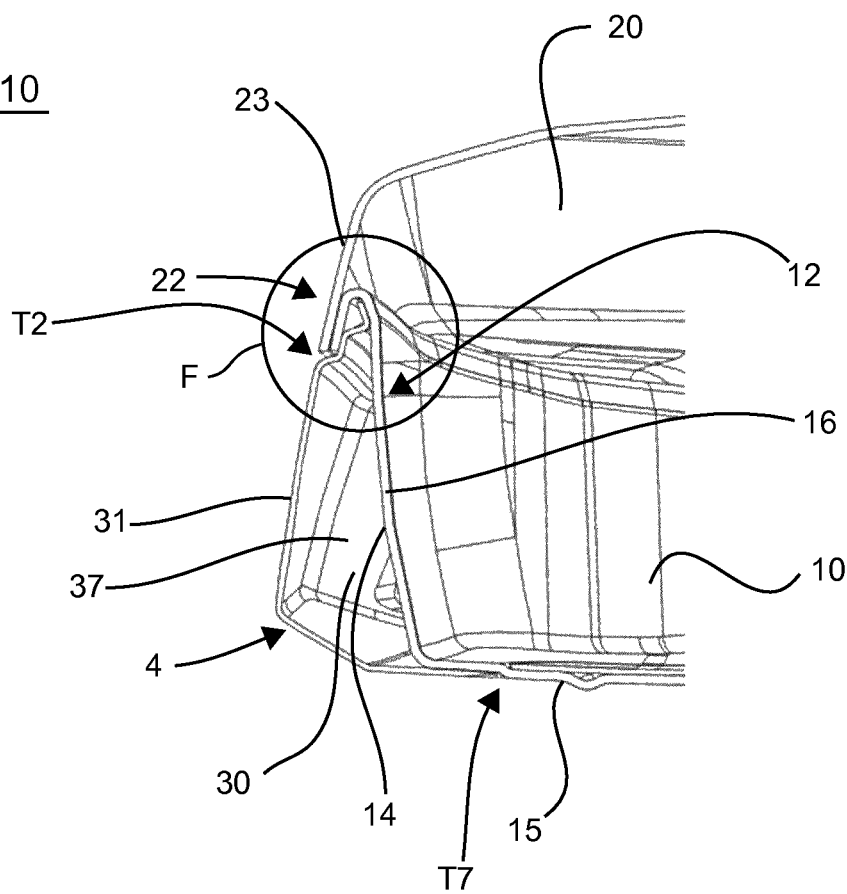
Fig. 10 — Detail E
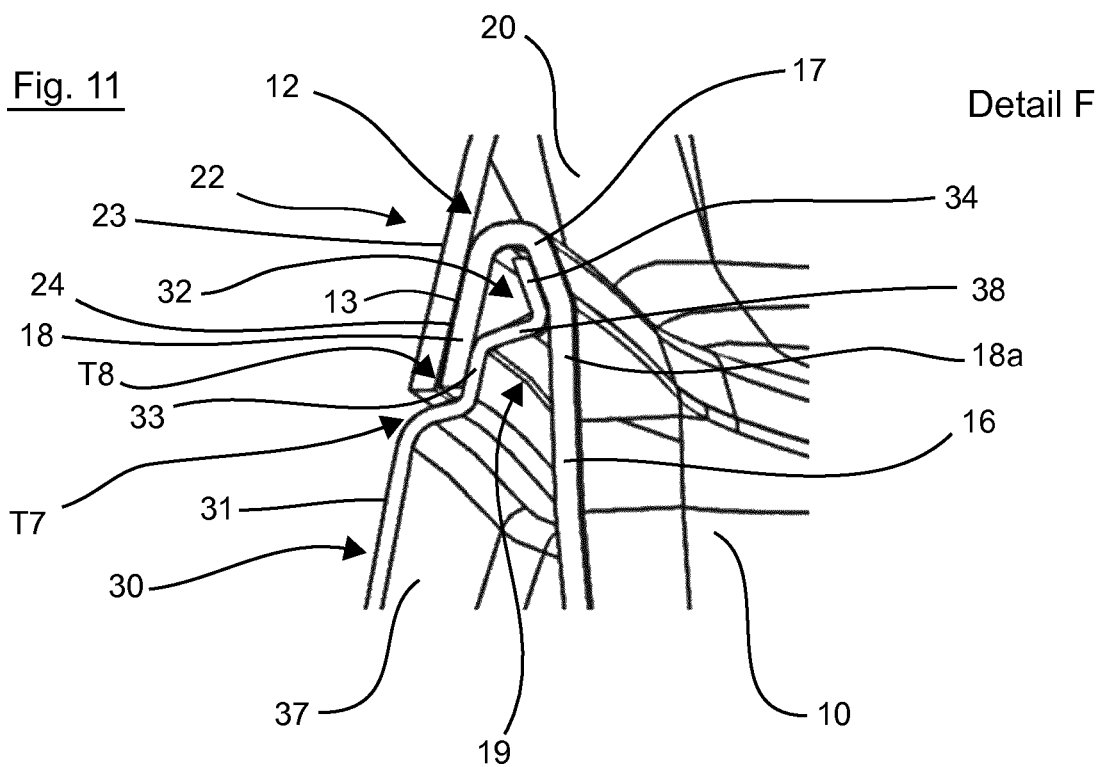
Fig. 11 — Detail F

CARGO CARRIER

FIELD OF THE INVENTION

The present invention relates to a cargo carrier comprising a base having a trough shape with an interior space for stowing goods to be transported therein and an openable and closable lid hingedly coupled with the base. The present invention further relates to a method for manufacturing such a cargo carrier.

BACKGROUND

Modern recreational activities involve the usage of bulky equipment. Thus, cargo carters for transporting goods, such as bulky sports equipment, on a vehicle roof grow in popularity. Furthermore, due to an increasing mobility, recreational activities are carried out more often, resulting in that cargo carriers are even used more frequently and over longer distances.

However, driving a vehicle with a rooftop cargo carrier results in a higher energy consumption compared to driving a vehicle without such a carrier. The higher energy consumption in turn results in a higher environmental pollution, which should be limited. Associated therewith, driving a vehicle with a rooftop cargo carrier also influences driving characteristics, particularly when driving a vehicle with high speed on a highway.

SUMMARY OF THE INVENTION

It is an object of the invention to manufacture and to provide an enhanced cargo carrier with less negative influence on driving efficiency, in particular regarding energy consumption, when mounted on a vehicle.

The object is solved in an aspect of the invention by a cargo carrier according to claim 1 and in a further aspect of the invention by a method for manufacturing a cargo carrier according to independent claim 15.

Advantageous further embodiments of the invention are subject of the dependent claims wherein specific further modifications of these embodiments can be gleaned from the following summary, from the detailed description of the embodiments and from the drawings themselves.

The cargo carrier according to the invention can be mountable on a vehicle. Preferably, the cargo carrier can be mountable on a vehicle roof, wherein the cargo carrier is configured as a rooftop cargo carrier.

According to the present invention, an add-on portion is attached to at least one of the base and the lid for enlarging the overall external volume of the cargo carrier. The overall external volume of the cargo carrier corresponds to the space which is taken by the cargo carrier. Thus, the cargo carrier comprises a volumetric add-on portion that can be mounted to at least one of the base and the lid. In other words, the add-on portion can be added to an outer surface of at least one of the base and the lid, wherein the add-on portion extends outwards from the outer surface of the base and/or the lid.

Accordingly, the add-on portion provides a volumetric expansion of the overall volume of the cargo carrier. Hence, the overall external volume of the cargo carrier including the add-portion is greater compared to the overall volume of the cargo carrier not including the add-on portion. Hence, outer dimensions or the outer size of the cargo carrier including the add-portion can be greater compared to outer dimensions or the outer size of the base and the lid without the add-on portion.

As regards the enlargement of the overall external volume of the cargo carrier, the add-on portion can provide an exterior space outside of the base not overlapping with the interior space of the base. Hence, the overall external volume may comprise the interior space having an internal volume and the exterior space having an additional volume. Accordingly, enlarging the overall external volume of the cargo carrier does not change the interior space of the base, wherein the exterior space and the additional volume is externally added to the base and/or the lid of the cargo carrier. The enlargement of the overall volume of the cargo carrier may also provide additional stowage space for goods in the add-on portion.

The add-on portion can be attached to the base or to the lid, wherein the add-on portion comprises at least one add-on part. Besides that, the add-on portion can be attached to both of the base and to the lid, wherein the add-on portion comprises at least two separate add-on parts, at least one of them being attached to the base and at least another one of them being attached to the lid. The at least two add-on parts can be arranged to the cargo carrier in a pivotable manner with respect to each other for opening or closing the lid.

The add-on portion enables the cargo carrier to have a more complex design. The external shape of the cargo carrier can thus be designed following a large variety of external surface shapes. The add-on portion can have a stabilizing effect making the lid or the base more rigid. The add-on portion of the cargo carrier can further have an aerodynamic effect. The aerodynamic effect can be achieved by an aerodynamically designed external shape of the cargo carrier, particularly provided by the add-on portion. Alternatively or additionally to the aerodynamic effect, a flush meeting of the add-on portion with the lid and/or base can be provided by the add-on portion.

The add-on portion can comprise an air displacement body added to the cargo carrier. Such an air displacement body can be provided by a solid body, a hollow body or a body filled with a filling material. Enhancing aerodynamics of the cargo carrier and providing a higher driving efficiency based thereon can thus be provided with such an air displacement body added to the cargo carrier.

The aerodynamic effect of the add-on portion, which may enhance aerodynamics, can be caused by a streamlined surface of the cargo carrier, which may result in less air resistance of the cargo carrier and less air turbulences occurring on the cargo carrier's outer surface. Less air turbulences can particularly occur near the rear of the cargo carrier. Less air resistance and less air turbulences can also result in less drag of the cargo carrier, which in turn can result in less fuel consumption of the vehicle. The aerodynamic effect can alternatively or additionally be caused by a spoiler surface of the cargo carrier, which also may generate less air turbulences resulting in less fuel consumption of the vehicle due to more laminar air flow. The aerodynamic effect particularly occurs when the cargo carrier is in motion.

Accordingly, a beneficial and preferable idea can be seen in reshaping the outer surface of a hingedly coupled base-lid system of a cargo carrier by adding at least one volumetric add-on part as an extra add-on element such that aerodynamics of the entire cargo carrier can be positively influenced. The reshaping with at least one add-on part can comprise a streamlined reshaping of the outer surface of the base-lid system and can alternatively or additionally comprise a front or rear spoiler, reshaping the outer surface of the base-lid system for changing the air flow around the cargo carrier. The front and rear spoiler are both members which may in addition be able to increase the rigidity of the base or the lid contributing to an overall stability of the cargo carrier. Hence, a cargo carrier can be designed and utilized as an active aerodynamic component of a vehicle when mounted thereon. "Active aerodynamic" can be understood as having a positive influence on aerodynamics, driving efficiency and/or driving characteristics.

The add-on portion can comprise a substantially straight or curved transition between the lid and the base following or not following a convex hull enveloping both of the base and the lid. A transition can comprise at least part of an outer surface of the add-on portion that is located between those elements between which the transition is provided. A transition can also comprise a gap that is located between those elements between which the transition is provided. A gap can be located between the add-on portion and one of those elements between which the transition is provided. A transition between the elements can also be configured as a substantially seamless transition, wherein a substantial gap may not be present.

According to a preferable embodiment, the add-on portion at least partially extends outside of a convex hull enveloping both of the base and the lid. The convex hull can comprise an outer enveloping surface of the base and lid. In other words, the convex hull can be spanned over the outer geometry of the base and the lid, wherein outer edges and corners of the base and lid are connected with each other rectilinearly, such that concave surface regions are non-existent on the enveloping surface. The convex hull of the base and lid can thus comprise plane patches forming a convex enveloping surface. The at least partially extension outside of such a convex hull, provided by the add-on portion, can have the positive effect of providing and manufacturing a wide scope of aerodynamic designs for different design layouts of different base-lid systems of cargo carriers. Manufacturing of the cargo carrier thus allows an efficient optimization of its aerodynamic layout.

According to a further preferable embodiment, the interior space is accessible through an upper opening defined by a rim portion of the base. Furthermore, the openable and closable lid can be adapted to be positioned in a closed state of the lid with an edge portion of the lid contacting the rim portion, in particular contacting an outer surface of the rim portion. In the closed state of the lid, the edge portion of the lid can contact or rest on an outer surface of the rim portion of the base. Accordingly, a step from the edge portion of the lid to the rim portion of the base can be present, wherein the step can occur from an outer surface of the edge portion to an outer surface of the rim portion. Regarding the add-on portion, it can comprise a bridging portion attached to the base or to the lid and can be formed to provide a transition between the edge portion of the lid, preferably an outer surface of the edge portion of the lid, and the rim portion of the base when the lid is in its closed state.

Preferably, the transition can follow the convex hull of the base and lid or can be at least partially located outside of the convex hull. Manufacturing such a geometric bridging of the base and lid can have the positive effect that a step, a recess or a groove on the outer surface of the base and lid can be reshaped or bridged by the add-on portion comprising the bridging portion. Such a reshaping or bridging in turn can provide a substantially streamlined outer surface of the cargo carrier.

The add-on portion can provide a substantially flush transition between the base and the lid of the cargo carrier. According to a further preferable embodiment, the bridging portion provides a substantially flush transition between an outer surface of the bridging portion and the outer surface of the lid and/or between the outer surface of the bridging portion and the outer surface of the base, preferably a lower outer surface of the base, when the lid is in the closed state. A substantially flush transition can comprise a transition being substantially flush within respective manufacturing tolerances for manufacturing a flush transition. Such a substantially flush transition can be provided between the outer surface of the bridging portion and the outer surface of the edge portion of the lid and/or between the outer surface of the bridging portion and the outer surface of the rim portion of the base. Providing such a substantially flush transition can further enhance an efficient streamlined design of the cargo carrier.

According to a further preferable embodiment, the rim portion of the base comprises a U-shape, wherein in the rim portion a wall portion of a side wall of the base is curved outward and over onto itself such that an edge portion of the side wall protrudes downwards, and wherein a gap is formed between the downwardly protruding edge portion and a portion of the side wall of the base. The gap can be traversed, covered or filled with the bridging portion of the add-on portion. The bridging portion can thus provide an air displacement body at least filling a recess within the U-shaped rim portion of the base.

Furthermore, the gap can provide an accommodation space for attaching the bridging portion to the base. According to a further preferable embodiment, an upper edge portion of the bridging portion is accommodated in the gap. The upper edge portion is preferably supported against wall portions defining the gap. Moreover, the upper edge portion can be supported, preferably double-supported, against opposite surface portions of wall portions facing towards an interior space of the gap. In other words, the upper edge portion of the bridging portion can be braced in the gap. Such an accommodation can be provided with a snap-fit assembly for attaching the bridging portion to the base when manufacturing the cargo carrier.

Preferably, in a closed state of the cargo carrier, a bottom edge of the lid can be accommodated in a recess formed in the bridging portion adjacent to the upper edge portion. Thus, a substantially flush transition between an outer surface of the bridging portion and an upper outer surface of the lid can be efficiently manufactured.

According to a further preferable embodiment, the upper edge portion of the bridging portion comprises two supporting sections being supported oppositely against the wall portions defining the gap, preferably with a first supporting section contacting a lower end portion of the edge portion of the side wall and a second supporting section contacting an opposite upper portion of the side wall of the base. Both supporting sections can be arranged in a staggered manner within the gap. The arrangement in the staggered manner can comprise a step-like arrangement of the support sections. Further, both supporting sections can be connected with an intermediate section, wherein the intermediate section is not in contact with the wall portions defining the gap.

According to a further preferable embodiment, the upper edge portion of the bridging portion is double-curved, preferably comprising a zig-zag shape. The upper edge portion of the bridging portion can comprise a Z-shape. Alternatively, the bridging portion can comprise an S-shape. The bridging portion can thus be double-bent when manufactured. Such a shape of the upper edge portion can provide an efficient bracing of the bridging portion within a gap or a groove of the base.

According to a further preferable embodiment, the upper edge portion of the bridging portion is bonded to the wall portions defining the gap, preferably by gluing. With the double-curved shape, the bridging portion can distribute an adhesive provided on the wall portions for bonding the bridging portion evenly between the supporting sections and the wall portions when sliding or snapping in the upper edge portion of the bridging portion into the gap during manufacturing the cargo carrier. Such a bonding of the bridging portion can provide a secure attachment of the bridging portion to the base of the cargo carrier.

According to an embodiment, the bridging portion can be configured as a frame surrounding the base and/or the lid. The frame can be arranged to the base and/or the lid in a substantially horizontal expansion. The frame can be attached to the gap, which can be a circumferential gap. The frame can comprise one or multiple frame parts. The frame can be integrally formed. In other words, the frame can be manufactured in one piece. Alternatively, the frame can comprise at least two bridging parts connected with each other forming the frame. Besides that, the frame can be interrupted comprising at least one bridging parts.

At least one handle and/or at least one lock part can be arranged to the base or lid of the cargo carrier one-sided or two-sided, wherein the lid can be openable on one side or on two sides. According to a further preferable embodiment, the bridging portion comprises a frame horizontally surrounding the base or the lid, wherein the frame preferably comprising at least one hole for a handle and/or a lock part of the cargo carrier. The add-on portion can thus be designed as a horizontally surrounding bridging part providing access to at least one handle and/or lock part. The add-on portion can further be designed as a circumferential spoiler frame horizontally surrounding the cargo carrier. This reduces the flexibility of the element to which it is added, for example the base, and may contribute to the prevention of a fish mouth opening due to a deformation of a front lower portion of the lid.

According to a further preferable embodiment, the bridging portion comprises a frame that extends around the base for creating a double-shell structure. The double shell structure can comprise the base forming an inner base shell and the frame forming an outer base shell of the cargo carrier. Thus, the frame can extend around the entire base. The frame can comprise minor cut-outs, for example providing passage regarding fixation elements. In other words, the double-shell structure can provide a twin-layer structure comprising the base as an inner layer and the frame as an outer layer. The frame can thus be manufactured having a trough shape, similar to the base itself, at least partly enclosing the base. This may be advantageous, as no centre-piece may be removed while manufacturing a frame part.

According to a further preferable embodiment, the at least one add-on portion comprises a spoiler portion attached to the lid, preferably to a rear portion of the lid, or to the base, preferably to a front portion of the base. Besides other effects mentioned, attaching a spoiler portion to the lid may reduce the flexibility of the lid and increase the stiffness or rigidity of the lid which is particularly effective in combination with a reinforced front portion of the lid that will be described later. According to a further embodiment of the cargo carrier, the add-on portion comprises two separate portions, the bridging portion and a spoiler portion. Preferably, a spoiler part is attached to a rear portion of the lid, wherein the spoiler portion can provide a rear spoiler of the cargo carrier. Such a spoiler can further provide enhanced aerodynamics of the cargo carrier in turn providing an enhanced driving stability of the vehicle. Furthermore, such a spoiler may increase the stability of the rear portion of the lid.

According to a further preferable embodiment, the spoiler portion provides a substantially flush transition between an outer surface of the spoiler portion and an outer surface of the bridging portion. In this embodiment, the add-on portion can comprise a spoiler portion attached to the rear of the lid and a bridging portion attached at least to the rear of the base. Features described with respect to transitions between the bridging portion and the lid or between the bridging portion and the base may also apply to the transition between the spoiler portion and the bridging portion according to this embodiment.

According to a further preferable embodiment, the spoiler portion comprises a gripping portion, preferably not protruding beyond a rear edge portion of the spoiler portion, for handling the cargo carrier. The gripping portion can comprise a handle that is recessed or integrated within the spoiler. Such a gripping portion can provide an efficient handling of the cargo while being aerodynamically efficient. A handle can alternatively be attached to an outer rear surface of the spoiler portion as an extra element.

According to a further aspect, the cargo carrier comprises a ground support that is provided by the base and/or the add-on portion for protecting fixation members of the cargo carrier from damage. A beneficial and preferable idea regarding this aspect can be seen in that such a ground support that is providable with the cargo carrier according to the invention on the one hand protects fixation members and on the other hand aerodynamically shields these fixation members. The base and/or the add-on portion can have a curved shape. An underside of the cargo carrier can have a concavely curved shape. The shape can be adapted to follow the shape of a roof of a vehicle. A vehicle roof shape can thus be followed by the concavely curved underside of the cargo carrier.

According to an embodiment of one of the aspects, the cargo carrier comprises fixation members for fixing the cargo carrier to a vehicle, the fixation members being arranged within a convex hull enveloping the base, the lid and the add-on portion, the base and/or the add-on portion preferably comprising at least two ground contact sections for supporting the cargo carrier on a substantially level ground. In other words, the fixation members do not protrude beyond the convex hull of the concavely curved underside of the cargo carrier. The ground contact sections can be configured and positioned such that a ground contact of the fixation members is prevented. The fixation members can be or can comprise cross bar attachment clamps or claws for attaching the cargo carrier to cross bars on a vehicle.

According to a further embodiment of one of the aspects, the ground contact sections can be aligned with the fixation members, i.e. can be arranged on the same level. Alternatively, the fixation members can protrude slightly beyond the convex hull such that the fixation members can contact the ground. Accordingly, the cargo carrier can be configured such that it can rest on both of the ground contact sections and the fixation members. In this way, a weight force of the cargo carrier is distributed between and transferred via contact sections and fixation members so that forces acting on the fixation members are at least reduced. In other words, the ground contact sections can be arranged on the underside of the cargo carrier slightly higher than the fixation members such that the fixation members receive some but not all of the contact pressure from the cargo carrier when the same is supported on the ground.

The fixation members may be movable to yield when in contact with the ground, so the ground contact sections will take the main pressure from the weight of the box.

According to a further embodiment of one of the aspects, the ground contact sections are arranged on the base. The add-on portion may thus not have ground contact sections touching the ground when the cargo carrier is supported thereon. The base can have a matte surface structure and the add-on portion can have a glossy surface structure. Accordingly, the frame and the rear spoiler of the add-on portion can have a glossy surface structure. The lid may also have a glossy surface structure. The matte surface structure is less scratch sensitive compared to the glossy surface structure. Due to the preferable configuration, only the base with its matte surface may touch the ground thus avoiding contact of the scratch sensitive, glossy surfaces of the add-on portion and the lid with the ground.

Such a configuration of the cargo carrier provides the advantageous effect, that when positioned on the vehicle roof the fixation member can be aerodynamically shielded and when positioned on the ground the fixation member can be protected from touching the ground and thus from ground contact and from damage caused thereby. The ground contact sections can be substantially point-type contact sections, wherein at least three point-type sections can be provided, and/or substantially line-type contact sections. Accordingly, the base and/or the add-on portion may partly contact the ground when positioned thereon. Accordingly, such a ground support concept can provide a wear protection of the fixation members while being particularly aerodynamically efficient at the same time.

The method for manufacturing a cargo carrier, in particular a rooftop cargo carrier, comprises the steps of forming, preferably moulding, a base having a trough shape with an interior space for stowing goods to be transported therein and a lid having a shape for covering the base. The method further comprises the step of hingedly coupling the lid with the base, so that the lid is openable and closable. Besides that, the method further comprises the step of attaching an add-on portion to at least one of the base and the lid, thereby enlarging the overall external volume of the cargo carrier. The add-on portion can have an aerodynamic effect.

According to a further aspect, a rear spoiler attachable to a cargo carrier is provided. The rear spoiler can be attachable to an openable and closable lid of the cargo carrier. The rear spoiler according to this aspect can comprise at least one feature of the spoiler portion of the add-on portion or vice versa.

Preferably, an upper edge portion of the rear spoiler can be attachable to a top surface of the lid, preferably to a step portion on the top surface. The rear spoiler can be configured to provide a substantially flush transition with the top surface of the lid. Additionally or alternatively, the rear spoiler, preferably a rear upper portion of the spoiler, can be configured to be engageable with the lid.

Preferably, a lower edge portion of the rear spoiler can be attachable to a bottom edge of the lid, preferably to a bulged edge surface. The rear spoiler can be configured to provide a substantially flush transition with the bottom edge of the lid. Additionally or alternatively, the rear spoiler, preferably a rear lower portion of the spoiler, can provide a substantially flush transition with a base of the cargo carrier and/or with an add-on portion attached to the base. A flush transition can further be provided between the frame surrounding the base and/or the lid or the bridging portion and a rear portion of the spoiler.

A further cargo carrier, in particular a rooftop cargo carrier, can be provided. The cargo carrier can comprise a base portion having a trough shape with an interior space for stowing goods to be transported therein. The interior space can be accessible through an upper opening defined by a rim portion. The cargo carrier can comprise an openable and closable lid hingedly coupled to the base portion and can be adapted to rest on the rim portion in a closed state with an edge portion of the lid contacting a laterally outer surface of the rim portion. The cargo carrier can comprise a bridging portion mounted to the base portion and being formed so as to provide a substantially seamless transition from an outer surface of the lid to an outer surface of the bridging portion when the lid is in the closed state. The components of this cargo carrier can be configured in the same way as the corresponding components of the cargo carrier described before.

Another cargo carrier, in particular rooftop cargo carrier, can be provided, wherein the cargo carrier comprises a base having a trough shape with an interior space for stowing goods to be transported therein and an openable and closable lid hingedly coupled with said base. The cargo carrier comprises an add-on portion attached to at least one of the base and the lid. The add-on portion comprises a frame surrounding said base, the frame preferably extending around the base for creating a double-shell structure comprising the base forming an inner base shell and the frame forming an outer base shell of the cargo carrier. The components of this cargo carrier can be configured in the same way as the corresponding components of the cargo carriers described before. The add-on portion can have an aerodynamic effect and/or be provided for enlarging the overall external volume of the cargo carrier.

According to a further aspect, a lid for a cargo carrier is provided. The cargo carrier can be a cargo carrier as described before and the lid can be used in combination with such a cargo carrier but also with different, for example conventional cargo carriers. The lid can comprise a reinforced front portion for reducing a flexibility of said lid at least in said reinforced front portion. The reinforced front portion can comprise a reinforcing structure, wherein said reinforcing structure can comprise at least two continuous elongate reinforcing sections. Accordingly, if the lid is used in addition to the add-on portion described above with respect to different cargo carriers, the reinforcing structure provided on the lid may be added to the cargo carrier which additionally provides rigidity in the lid.

Each of the at least two continuous elongate reinforcing sections may extend along or may be defined in an inner surface of the lid and may comprise different main extension directions. The at least two continuous elongate reinforcing sections can cross each other. Alternatively or additionally each of the at least two continuous elongate reinforcing sections can extend along a path defined by a differentiable function.

An advantageous effect of such a reinforced lid may be seen in that the rigidity of the front portion of the lid is increased thereby at least reducing, preferably fully preventing, a deformation of said lid due to internal or external forces acting on the lid, in particular forces which may lead to the undesired fish mouth opening generated due to a deformation of a front lower portion of the lid. The front portion of the lid may thus be or comprise a front stiffening or a front reinforcement of the lid. In other words, increasing the rigidity renders the front portion of the lid less prone to deformations.

The reinforcing structure may be provided on the lid or may be provided in the lid. In other words, the reinforced front portion may be a separate member applied on the lid or may be a structure integrally formed with or in the lid.

Preferably, the lid comprises an inner wall and the reinforcing structure is provided on the inner wall of the lid in the front portion of the lid. The reinforcing structure may be structured according to the shape of the inner wall of the lid such that an outer contour of the reinforcing structure at least partially follows a shape of the inner wall of the lid. In this way, a contact between the reinforcing structure and the lid can be provided which is advantageous for attaching the reinforcing structure on the inner wall of the lid. The reinforcing structure can be attached to the inner wall by means of suitable fixation members, for example rivets, or may be bonded to the inner wall, for example by means of gluing or welding.

The reinforcing structure may be formed in or as a sheet which is applied in the front portion of the lid on the inner surface of the lid. The sheet may be a single, unbroken sheet. The reinforcing structure may be formed by plastically deforming the sheet or by moulding a sheet with a specific pattern creating rigidity and stiffness. The sheet can comprise a dimension and shape allowing it to be attached to the lid in a manner such that it not only covers an inner top wall portion of the front portion of the lid but also extends at least partially downwards along an inner side wall of the lid continuing from the inner top wall. The sheet may further be configured such that corners of the inner wall of the lid remain uncovered by the sheet. This saves weight and only slightly reduces the overall rigidity added to the front portion of the lid by the sheet.

The reinforcing structure may be configured to extend over a majority of the lid front portion, preferably substantially the entire lid front portion, for example transversally across the inner surface of the lid in the front portion and from the front end portion of the inner wall of the lid up to or even past the foremost hinge attachment portions on the lid. In case the reinforcing structure comprises a sheet, preferably an unbroken one, the sheet may be configured to cover the majority of the lid front portion.

Optionally, a further reinforcing structure may be configured to extend over a lid middle portion, preferably laterally over the lid middle portion. The optional further reinforcing structure may be separate from the reinforcing structure described.

In the context of the present disclosure, the main extension direction of a reinforcing section may relate to a direction in which the respective elongate reinforcing section mainly extends in length direction. In a straight elongate reinforcing section, the main extension direction corresponds to or is parallel to a longitudinal axis of the straight elongate reinforcing section. In a curved or arcuate elongate reinforcing section, the main extension direction may be seen in a direction of a straight line connecting the end of the elongate reinforcing section. A main extension direction can be defined as a net path of an elongate reinforcing section on a projection plane parallel to the base portion of the cargo carrier. A net path is the direct path from the beginning of an elongate reinforcing section to the end of said section, without taking the real form of said section into account. For example, one of the elongate reinforcing sections may extend in cross direction of the lid, which means cross to a longitudinal direction of the lid, and another reinforcing section of the at least two elongate reinforcing sections may extend in longitudinal direction of the lid. The geometry of the reinforcing sections may thus comprise at least in part a (double) cross structure or a hash structure. At least one of the elongate reinforcing sections may be curved in one direction. Preferably, one or more of the elongate reinforcing sections comprises a curved or bent shape. Preferably, one or more of the elongate reinforcing sections comprises a straight shape. Accordingly, the reinforcement sections can extend in multiple directions.

According to a preferable configuration, one of the elongate reinforcing sections extends in longitudinal direction of the lid and another one of the elongate reinforcing sections extends in cross direction of the lid. The elongate reinforcing section extending in cross direction or transversal direction of the lid may be curved in a convex manner towards the front end of the lid. In other words, the elongate reinforcing section extending in cross direction may comprise a middle section which is bulged towards the front end of the lid. Two or more elongate reinforcing sections may penetrate each other. In a preferably configuration, two elongate reinforcing sections, preferably substantially parallel elongate reinforcing sections, extend in longitudinal direction of the lid and at least one reinforcing section crosses both of the elongate reinforcing sections. At least one of the at least one crossing reinforcing section is curved or arcuate. At least a foremost one of the at least one crossing reinforcing section may be curved corresponding to a forward wall portion of the lid, that preferably extends substantially vertically. The forward end portions of two, preferably parallel, elongate reinforcing sections and a portion of the reinforcing section crossing them may define a U-shape limiting a fixation area of a hinge or lid lifter for assisting an opening of the lid when the same is mounted on a base portion. In such a configuration, the forward end portions may in longitudinal direction of the lid extend beyond the fixation area providing additional rigidity in the fixation area.

Alternatively or in addition, at least two of the at least two continuous elongate reinforcing sections may cross each other.

Alternatively or in addition, at least one of the at least two continuous elongate reinforcing sections can preferably extend along a path defined by a differentiable function. The differentiable function may be a constantly differentiable function. Accordingly, at least one of the at least two continuous elongate reinforcing sections extends along a path without kinks or sharp bends. Hence, the path may be formed smoothly. Thus, the exact form of each of said elongate reinforcing sections can be described by a differentiable function, with a differentiable function being defined as a mathematical function whose derivative exists at each point in its domain. The mathematical function may be for example a polynomial function or a spline. Each or at least one continuous elongate reinforcing section can be formed along a kinkless, uninterrupted path.

Preferably at least one, more preferably all of the crossing elongate reinforcing sections is/are continuous, that is to say unbroken or contiguous along its/their entire length. In the context of the present disclosure the term unbroken may be understood in such a manner that at least one dimensioning of an elongate reinforcing section remains substantially constant along the entire length of the same. Depending on the configuration of the elongate reinforcing section possible dimensionings include but are not limited to a width of the elongate reinforcing section, a height of the elongate reinforcing section and a wall thickness of the elongate reinforcing section. For example, the elongate reinforcing sections may comprise a substantially constant height along their length of extension while the width may vary or may also be constant. Preferably, the width is also substantially constant. Thus, it is preferable if an unbroken distance between lid wall and a free end portion or reinforcing wall limiting said elongate reinforcing sections is created and not decreased along substantially the entire length of said elongate reinforcing sections.

An elongate reinforcing section may be considered continuous if there is no offset between adjacent portions which fully separates the portions from each other along the extension direction. However, it is possible that portions of an elongate reinforcing section are offset or shifted with respect to each other to a certain extent but in a manner that does not interrupt the elongate reinforcing section. For example, an elongate reinforcing section having a certain width may cross another elongate reinforcing section so that portions of the elongate reinforcing portion are located on both sides of the elongate reinforcing section it crosses. The elongate reinforcing portion can comprise a specific width, can meet another elongate reinforcing section and can continue on the other side in an offset or shifted manner. Accordingly, while the width of the elongate reinforcing portion may retained constant while crossing another elongate reinforcing portion, the portion entering the other elongate reinforcing section and the portion leaving the other elongate reinforcing member can be offset with respect to each other in a manner such that the portions still partially overlap. Intersecting sections between two elongate reinforcing sections do not form an interruption within the context of this description.

Preferably, each continuous elongate reinforcing section extends over a significant portion of the front portion of the lid, for example at least two thirds of front portion of the lid in longitudinal direction of the lid, more preferably over the entire front portion, which means the continuous elongate reinforcing section may extend up to and, preferably even a predetermined distance into a side wall of the lid forming an end section of the lid and in particular forming an end section or edge of the lid for contacting a base portion. Preferably, at least one of the reinforcing sections extends across the majority of the lid width.

The front portion of the lid may be the portion of the lid ranging from a hinge mechanism fixation portion on the lid, preferably ranging from a forward end of the hinge mechanism fixation portion in the longitudinal direction of the lid, up to the front end of the lid. Accordingly, the front portion of the lid may be seen as the portion of the lid protruding beyond the foremost hinge mechanisms coupled to the lid. At a forward end region of the forward portion, a hinge or lid lifter may be fixed for assisting an opening of the lid when the same is mounted on a base portion. Thus, the reinforcing structure which may be a sheet as described above may at least extend between a lid lifter and foremost hinges so that these are secured through both the lid and the reinforcement sheet. In other words, the sheet may be formed to create a double layer structure in the fixation areas of hinges and a lid lifter. A lid lifter is a structure assisting the process of lifting said lid from said base when opening said cargo carrier. A lid lifter can be a hydraulic lid lifter. Also, an open position of a lid can be maintained by said lid lifter keeping said lid in an opened position with respect to said base for loading and unloading said cargo carrier without having to hold the lid manually throughout the loading and unloading process. A hinge can be any hinge coupling said base and said lid hingedly. As a user may open said cargo carrier by lifting said lid at different positions, for instance at the side walls or at the front, different forces may be applied on the lid during the lifting process. A reinforcing structure extending at least between said hinge and said lid lifter may support said lid lifting and lid lowering process by stabilizing the lid when a user opens the lid.

The elongate reinforcing sections may be embodied as ribs or protrusions. Thus, elongate reinforcing ribs may form the elongate reinforcing sections. The ribs can be made of solid material or may comprise a hollow interior. Each rib may form a single elongate reinforcing section. Thus, according to the present disclosure a lattice or grid like structure can be embodied by the ribs which functions as reinforcement when applied on the inner wall of the front portion of the lid thereby forming the reinforced front portion of the lid.

The reinforcing structure may also be formed from moulding a sheet, preferably having a substantially constant thickness, in such a manner that channels or grooves are formed on one side of the sheet and protrusions are formed on corresponding portions on the opposite side of the sheet. The grooves or channels can comprise a specific depth resulting in protrusions on the opposite side comprising a specific height wherein the specific depth and height may be substantially constant. The channels formed on one side and the corresponding protrusions on the other side of the sheet may comprise a specific width which is preferably substantially constant over the entire length of the channels and protrusions. Deviations may occur in regions in which two channels or grooves cross each other.

The areas of the sheet between the grooves or channels may be available for fixing the reinforcing structure on the inner wall of the lid. Such areas may be referred to as fixation portions. The reinforcing structure may be formed such that the fixation portions comprise a width which is larger than the width of the grooves or channels and protrusions. This provides a large support area for supporting the reinforcing structure on the inner wall of the lid, which may be used for bonding the reinforcing structure to the inner wall of the lid, for example by gluing creating a strong bond.

The reinforcing structure may comprise ribs arranged, preferably fixedly attached, on a sheet or integrally formed with the sheet.

The reinforcing structure may comprise a grid, lattice, mesh or hash like pattern formed from elongate reinforcing sections, preferably ribs or protrusions, crossing each other. The pattern may be integrally formed with the lid so that the lid and the reinforcing structure form a unitary piece. The pattern may be formed as a separate member which is attached to the lid. The pattern may thus be an add-on part attachable to the lid.

The grid or lattice like pattern may be formed by a first group of substantially parallel ribs or protrusions and a second group of substantially parallel ribs or protrusions which are arranged angled with respect to the ribs of the first group such that they cross or penetrate the ribs of the first group. In this way, rhombic, rectangular or quadratic sections fixation portions may be created between the ribs or protrusions.

With the above reinforcing structure, a reinforcement may be created in the front of the lid, which reinforcement extends in two directions. A first reinforcement section may extend in a first direction and a second reinforcement section may extend in a second direction that is different from the first direction. The reinforcement sections extend in at least two directions, preferably in primary and secondary directions, preferably crosswise or perpendicularly to each other.

Since the reinforced front portion securely prevents the above fish mouth effect or behaviour, it is not necessary to provide a bridging portion at the front portion of the lid for additionally coupling the lid to the base or a stop member at the front inner end of a cargo carrier mounted to the base or the lid and protruding into the other one of the lid and the base to avoid that a transported load reaches the forward end of the cargo carrier and passes between the lid and the base under formation of an opening which may look like an opened fish mouth.

BRIEF DESCRIPTION OF THE DRAWINGS

FIG. 5 shows the cargo carrier of FIG. 1 in a longitudinal sectional view.

FIG. 6 shows a front portion of the cargo carrier in a detail view taken from the longitudinal sectional view of FIG. 5.

FIG. 7 shows a rear portion of the cargo carrier in a detail view taken from the longitudinal sectional view of FIG. 5.

FIG. 8 shows the cargo carrier of FIG. 1 in a first cross sectional view.

FIG. 9 shows the cargo carrier of FIG. 1 in a second cross sectional view.

FIG. 10 shows a lateral portion of the cargo carrier in a detail view taken from the first cross sectional view of FIG. 8.

FIG. 11 shows a further lateral portion of the cargo carrier in a further detail view taken from the detail view of FIG. 10.

DETAILED DESCRIPTION OF EMBODIMENTS

Figure 1:
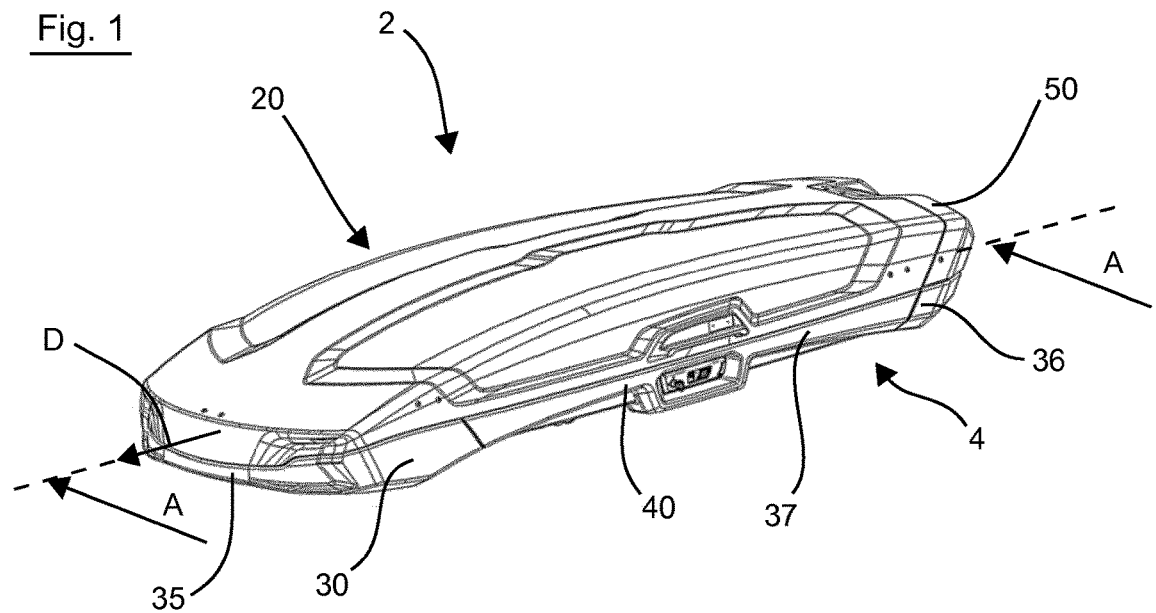
FIG. 1 shows a cargo carrier in a perspective view from above according to an embodiment.

In FIG. 1, a cargo carrier 2 according to an embodiment of the invention is shown in a perspective view from above. The cargo carrier 2 comprises a base (not visible in FIG. 1), an openable and closable lid 20 and an add-on portion 4 that is attached to both of the base and to the lid 20. The lid 20 may be one of the reinforced lids 20 described with respect to FIGS. 16 to 25. The lid 20 is hingedly coupled with the base. The add-on portion 4 is fixedly coupled with the lid 20 and with the base, respectively.

The add-on portion 4 may add stability contributing to an increase in overall stiffness of the cargo carrier. The reinforced front portion 21 of the reinforced lids 20 described with respect to FIGS. 16 to 25 may add additional stability contributing to an increase in overall stiffness of the cargo carrier 2 in addition to the add-on portion 4.

The add-on portion 4 comprises a bridging portion 30 and a spoiler portion 50. The bridging portion 30 is attached to the base and the spoiler portion 50 is attached to a rear portion of the lid 20. As the lid 20 is openable and closable, the bridging portion 30 and the spoiler portion 50 are not interconnected to allow movability of the lid 20 relative to the base.

The bridging portion 30 is designed as a frame 40 horizontally surrounding the base. The integrally formed frame 40 comprises a plurality of bridging portions, a front bridging portion 35, a rear bridging portion 36 and two lateral bridging portions 37. Alternatively, the frame can be assembled from these bridging portions 35, 36, 37 which can be provided by at least two separate bridging parts and which can be connected to each other. A left lateral bridging portions 37 is arranged between a left lateral portion of the front bridging portion 35 and a left lateral portion of the rear bridging portion 36. A right lateral bridging portions 37 is arranged between a right lateral portion of the front bridging portion 35 and a right lateral portion of the rear bridging portion 36. The terms "front", "rear", "left" and "right" refer to a direction of motion D of the cargo carrier 2 when mounted on a vehicle roof (not shown in the Figures).

The cargo carrier 2 as shown in FIG. 1 comprises a longitudinal central axis A-A. This axis A-A runs horizontally in a vertical plane of symmetry regarding the outer shape of the lid 20, the base, the bridging portion 30 and/or the spoiler portion 50 of the add-on portion 4. In other words, these components comprise a mirror-symmetry with respect to the vertical plane of symmetry, such that a symmetrical aerodynamic design axis is provided.

Figure 2:
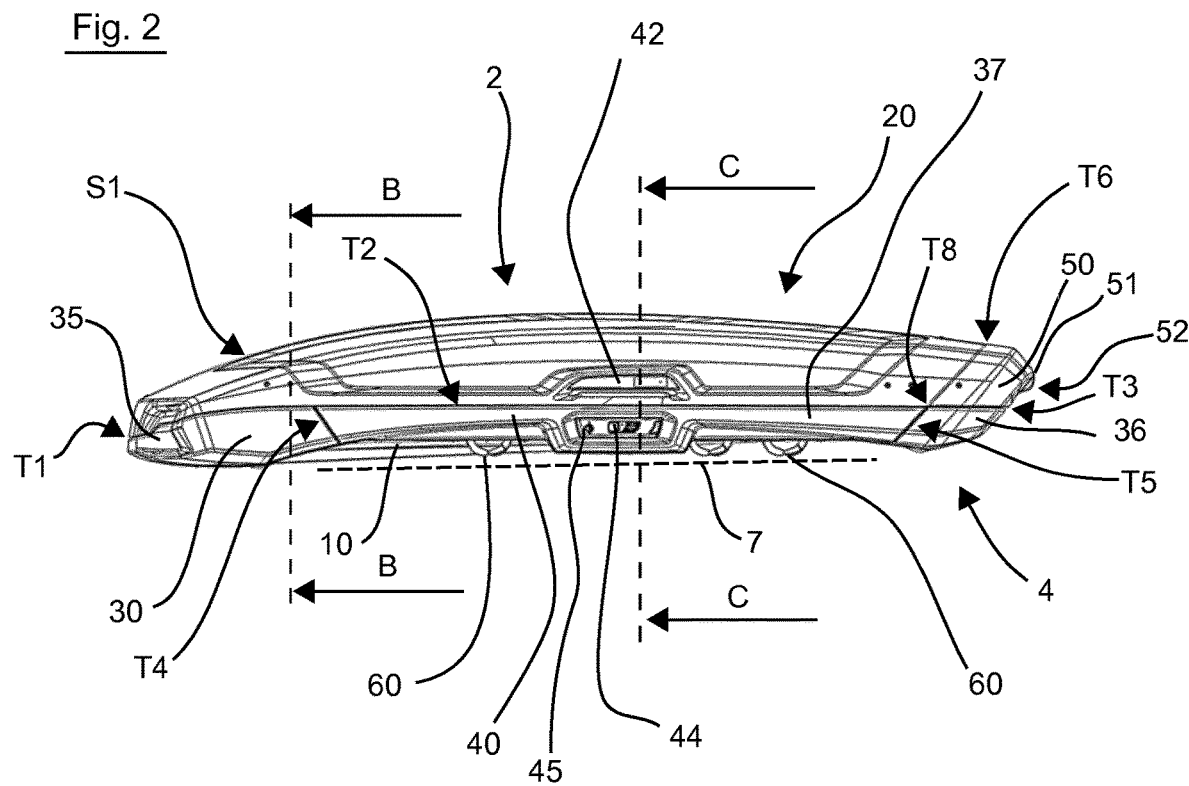
FIG. 2 shows the cargo carrier of FIG. 1 in a side view.

In FIG. 2, the cargo carrier 2 according to the embodiment of FIG. 1 is shown from its left side. The base 10 is partly shown. The outer shape of the cargo carrier 2 is designed as follows: A first substantially flush transition T1 is provided between a front portion of the lid 20 and the front bridging portion 35. Second substantially flush transitions T2 are provided between lateral portions of the lid 20 and each of the lateral bridging portions 37. A third substantially flush transition T3 is provided between an outer surface 51 of the spoiler portion 50 to the rear bridging portion 36. Substantially flush passages T4 are provided between the front bridging portion 35 and each of the lateral bridging portions 37, which can be substantially fourth flush transitions in case of the frame being assembled from separate bridging parts. Substantially flush passages T5 are provided between the rear bridging portion 36 and each of the lateral bridging portions 37, which can be substantially fifth flush transitions in case of the frame being assembled from separate bridging parts. A sixth substantially flush transition T6 is provided between the spoiler portion 50 and a rear portion of the lid 20. A longitudinal silhouette S1, resulting from a longitudinal section of the cargo carrier 2, comprises in clockwise direction transitions T1, T6 and T3 wherein the silhouette S1 is thus designed as a substantially flush contour of the cargo carrier 2.

The spoiler portion 50 comprises a gripping portion 52. The cargo carrier 2 comprises a lateral handle 42 and a lock part 44. The lateral handle 42 is arranged on the lid 20 for opening and closing the lid 20 manually. The lock part 44 is arranged on the base 10 for engaging and locking the closed lid 20. One of the lateral bridging portions 37 of the frame 40 comprises a lock recess 45 allowing access to the lock part 44 even though the base 10 is surrounded by the bridging portion 30.

The cargo carrier 2 further comprises fixation members 60 attached to bottom portions of the base 10. These fixation members 60 allow a fixation of the cargo carrier 2 on respective cross members (not shown) mounted on a vehicle roof. Regarding a convex hull 7 enveloping the base 10, the lid 20 and the add-on portion 4, all fixation members 60 are located inside of this convex hull 7.

Figure 3:
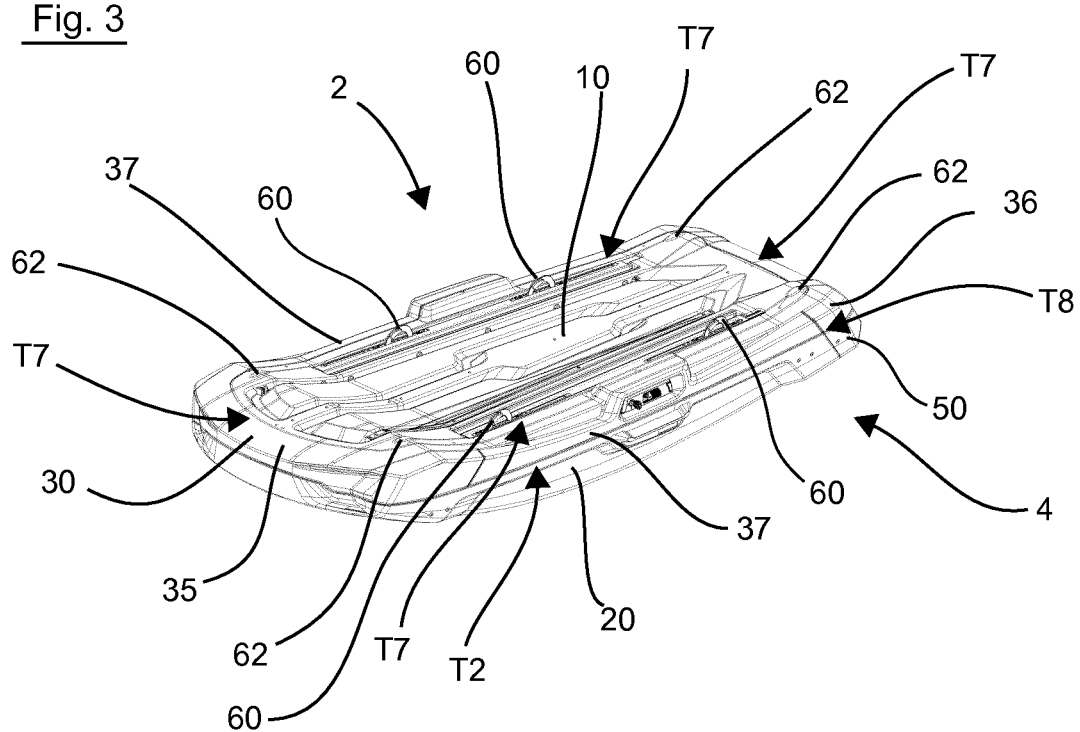
FIG. 3 shows the cargo carrier of FIG. 1 in in a perspective view from below.

In FIG. 3, the cargo carrier 2 is shown in a perspective view from below. The fixation members 60, e.g. four fixation members 60, are attached to the base 10 in a longitudinally shiftable manner for being adapted to differently spaced cross members. Besides that, ground contact sections 62 are arranged on the base 10, e.g. two on a front portion of the base 10 and two on a rear portion of the base 10. Alternatively, ground contact sections 62 can be arranged on the add-on portion 4, more specifically on the bridging portion 30, e.g. two ground contact sections 62 on the front bridging portion 35 and two ground contact sections 62 on the rear bridging portion 36.

As further shown in FIG. 3, seventh substantially flush transitions T7 are provided between the front bridging portion 35 and the base 10, between the rear bridging portion 36 and the base 10 and between each of the lateral bridging portions 37 and the base 10. A cross silhouette S2, resulting from a cross section of the cargo carrier 2 (shown in FIG. 8) comprising second transitions T2 (described with respect to FIG. 2) and seventh transitions T7 is thus designed as a further substantially flush contour of the cargo carrier 2.

Figure 4:
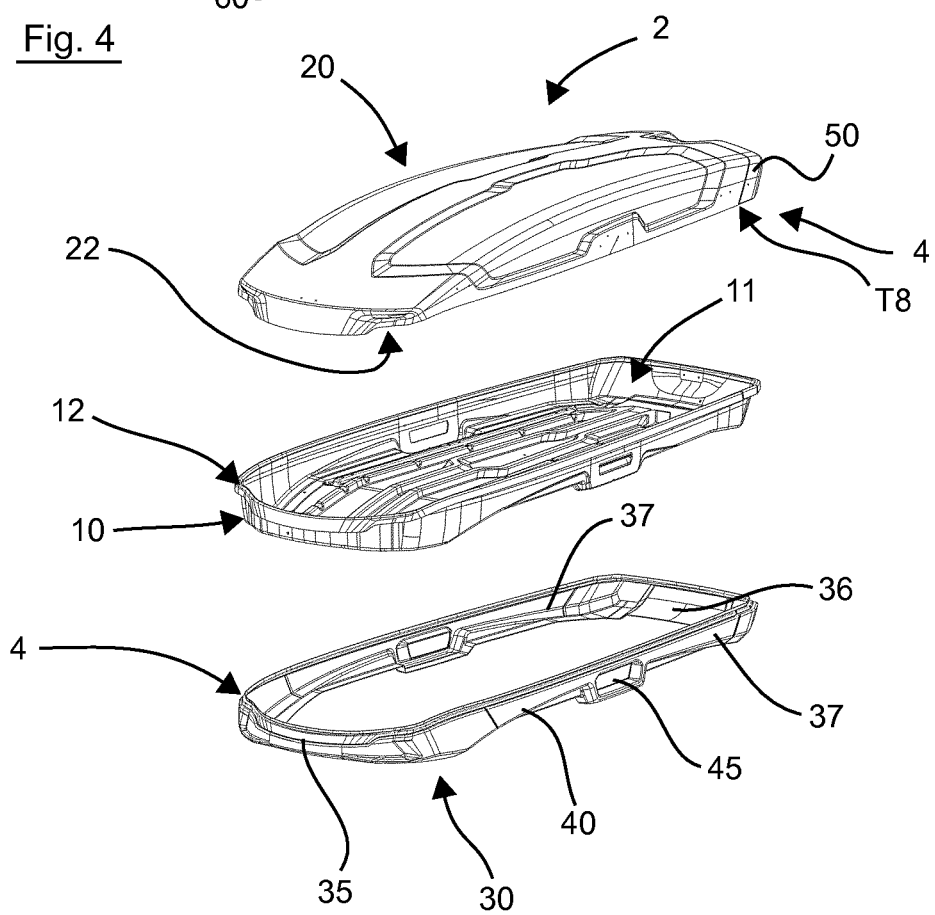
FIG. 4 shows the cargo carrier of FIG. 1 in an exploded view.

In FIG. 4, the cargo carrier 2 is shown in an exploded view, wherein top down the lid 20 with the spoiler portion 50 of the add-on portion 4, the base 10 and the bridging portion 30 of the add-on portion 4 are each shown separately. The lid 20 comprises an edge portion 22 at a bottom side of the lid 20. The base 10 comprises a rim portion 12 on its top side. Inside of the base 10, an interior space 11 is provided for stowing goods (not shown) inside the cargo carrier 2, more specifically inside the base 10 and/or the lid 20. The bridging portion 30 comprises the front bridging portion 35, the rear bridging portion 36 and the two lateral bridging portions 37 forming the frame 40.

The lid 20 is coupled to the base 10 by at least one hinge (not shown). The bridging portion 30 of the add-on portion 4 is engaged with the base 10 and the spoiler portion 50 of the add-on portion 4 is engaged with the lid 20 when the add-on portion 4 is added to the base 10 and lid 20, respectively. A manufacturing process of the cargo carrier 2 may thus comprise respective engagements steps.

In FIG. 5, the cargo carrier 2 is shown in the longitudinal vertical section A-A as indicated in FIG. 1. A detail C of FIG. 5 with respect to the bridging portion 30, more specifically with respect to the front bridging portion 35, attached to the base 10 is marked and is further described with respect to FIG. 6 and a detail D of FIG. 5 with respect to the spoiler portion 50 attached to the lid 20 is marked and is further described with respect to FIG. 7. Fixation members 60 are slidably attached to the base 10.

In FIG. 6, detail C of FIG. 5 is shown. In the closed state of the lid 20, the edge portion 22 of the lid 20 rests on the rim portion 12 of the base 10. The bridging portion 30, more specifically the front bridging portion 35, engages from below with the base 10, more specifically into the rim portion 12. Besides that, the bridging portion 30, more specifically the front bridging portion 35, covers a bottom edge portion 9, more specifically a front bottom edge portion, of the base 10.

A part of a convex hull 6 of the base 10 and the lid 20 is schematically shown, enveloping the base 10 and the lid 20. The bridging portion 30, more specifically the front bridging portion 35, extends outwards from the base 10 and protrudes beyond the convex hull 6. In other words, a sub-portion of the front bridging portion 35 is located within the convex hull 6, wherein this sub-portion is engaged with the rim portion 12 of the base 10, and a further sub-portion of the front bridging portion 35 is located outside of the convex hull 6, wherein this sub-portion provides the substantially flush transitions T1, T7 between the front bridging portion 35 and the lid 20 and between the front bridging portion 35 and the base 10. As further shown in FIG. 6, a profile of the bridging portion 30, more specifically of the front bridging portion 35, is substantially formed as a polygonal chain. Alternatively or additionally, the profile of the bridging portion 30 can be curved.

In FIG. 7, detail D of FIG. 5 is shown. In the closed state of the lid 20, the rear bridging portion 36, is engaged from below with the base 10, more specifically with the rim portion 12. The rear bridging portion 36 covers a rear bottom edge portion of the base 10. The convex hull 6 of the base 10 and lid 20 of FIG. 6 is again shown in FIG. 7. The bridging portion 30, more specifically the rear bridging portion 36, extends outwards from the base 10 and protrudes beyond the convex hull 6. Furthermore, also the lateral bridging portions 37 can protrude beyond the convex hull 6 (not shown in FIGS. 6 and 7).

In other words, a sub-portion of the rear bridging portion 36 is located within the convex hull 6, wherein this sub-portion engages with the rim portion 12 of the base 10, and a further sub-portion of the rear bridging portion 36 is located outside of the convex hull 6, wherein this sub-portion provides the substantially flush transitions T3, T7 between the rear bridging portion 36 and the spoiler portion 50 and between the rear bridging portion 36 and the base 10. The flush transition T3 is thus further provided between the frame 40 and a rear portion of the spoiler portion 50. As further shown in FIG. 7, a profile of the rear bridging portion 36 is substantially formed as a polygonal chain. Alternatively or additionally, this profile can be curved. The spoiler portion 50 may be bolted or riveted to the lid 20, preferably adjacent to the flush transition T6.

Regarding a profile of the spoiler portion 50 as partly shown in FIG. 7, the profile comprises a wing-shaped contour arranged to the rear of the cargo carrier 2. The contour is substantially formed as a polygonal chain having a substantially triangular base shape as shown in FIG. 7. Additionally or alternatively, the contour can be curved. A substantially flat rear portion of the lid 20 is thus elongated in rearward direction of the cargo carrier 2. These shapes are provided by adding the spoiler portion 50 to the lid 20.

In FIG. 8, the cargo carrier 2 is shown in a cross section B-B as indicated in FIG. 2. Regarding the add-on portion 4, a detail E of FIG. 8 with respect to the bridging portion 30 attached to the base 10, more specifically to one of the lateral bridging portions 37, is marked and is further described with reference to FIG. 10. Substantially flush transitions T2, T7 between the lateral bridging portion 37 and the lid 20 and between the lateral bridging portion 37 and the base 10, as already described with respect to FIGS. 2 and 3 are also shown in FIG. 8. The cross silhouette S2 provides a substantially flush cross section of the cargo carrier 2.

In FIG. 9, the cargo carrier 2 is shown in a further cross section C-C as further indicated in FIG. 2. As shown in FIG. 9, the lid 20 is openable and closable on each of both lateral sides of the cargo carrier 2 with a respective lock and hinge mechanisms 46 arranged inside of the cargo carrier 2. A handle 42 is attached to the lid 20 on both lateral sides of the cargo carrier 2. Furthermore, a lock part 44 and a respective lock recess 45 within the frame 40 are arranged to the base 10 on both lateral sides of the cargo carrier 2. Adjacent to the lock recess 45, the bridging portion 30 is divided into an upper portion 37a of the lateral bridging portion 37 and into a lower portion 37b of the lateral bridging portion 37.

In FIG. 10 detail E of FIG. 8 is shown. The second substantially flush transition T2 is provided between an outer surface 23 of the edge portion 22 of the lid 20 and an outer surface 31 of the bridging portion 30, more specifically between an outer surface 23 of a lateral edge portion 22 of the lid 20 and an outer surface 31 of a lateral bridging portion 37.

The seventh substantially flush transition T7 is provided between the outer surface 31 of the bridging portion 30 and a lower outer surface 15 of the base 10. Alternatively, the seventh substantially flush transition T7 can be provided between the outer surface 31 of the bridging portion 30 and an outer surface 14 of a side wall 16 of the base 10. Regarding an attachment of the bridging portion 30 to the base 10 and regarding a resting of the lid 20 on the base 10, detail F is marked in FIG. 10 and is further described in FIG. 11.

In FIG. 11, detail F of FIG. 10 is shown. In the closed state of the lid 20, an inner surface 24 of the edge portion 22 of the lid 20 rests on an outer surface 13 of the rim portion 12 of the base 10. A substantially flush edge transition T8 (also indicated in FIGS. 2 and 3) is provided between an end portion of the edge portion 22 of the lid 20 and an end portion of the rim portion 12 of the base 10. Also shown in FIG. 11, the outer surface 31 of the bridging portion 30, more specifically of the lateral bridging portion 37, is substantially flush with the outer surface 23 of the lid 20, wherein a gap is provided at the respective substantially flush transition T7.

Figure 12:
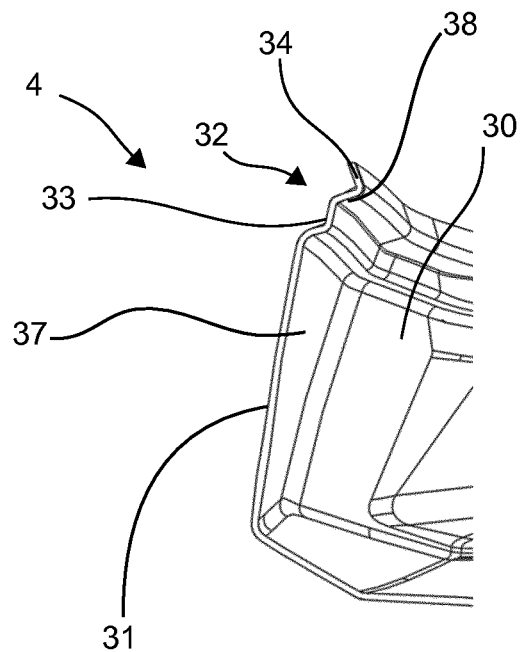
FIG. 12 shows a portion of an add-on portion of the cargo carrier of FIG. 1 taken from the detail view of FIG. 10 in an isolated manner.

As shown in FIGS. 11 and 12, an upper edge portion 32 of the bridging portion 30 has a first supporting section 33 and a second supporting section 34. The first supporting section 33 and the second supporting section 34 are connected with an intermediate section 38.

Figure 13:
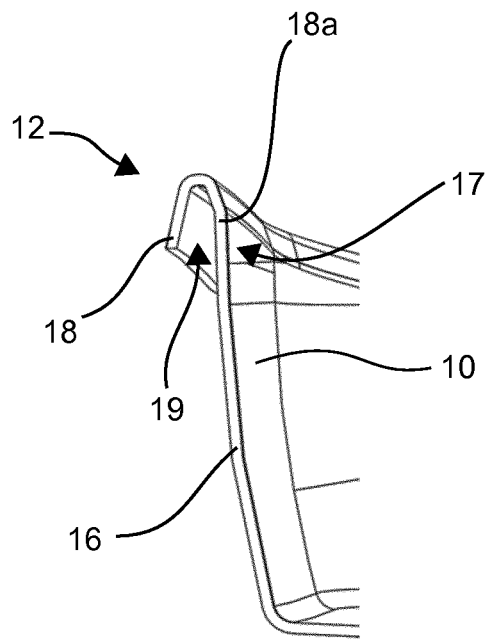
FIG. 13 shows a portion of a base portion of the cargo carrier of FIG. 1 taken from the detail view of FIG. 10 in an isolated manner.

As shown in FIGS. 11 and 13, the rim portion 12 of the base 10 comprises a U-shaped wall portion 17 at an upper end of the base 10, more specifically at an upper end of a side wall 16 of the base 10. The U-shape is provided by curving the wall portion 17 outward and over onto itself. An edge portion 18 of the side wall 16 thus protrudes downwards and is located opposite to a remaining non-curved portion 18a of the side wall 16. Within a U-portion of the U-shaped wall portion 17, a gap 19 is be provided. The gap 19 is formed between the downwardly protruding edge portion 18 and the opposite portion 18a of the side wall 16.

As shown in FIG. 11, the first supporting section 33 contacts the edge portion 18 of the side wall 16. The second supporting section 34 contacts the opposite portion 18a of the side wall 16. The first supporting section 33 and the second supporting section 34 is supported against the edge portion 18 of the side wall 16 and against the opposite portion 18a of the side wall 16, respectively. The supporting sections 33, 34 are arranged at different heights within the gap 19, wherein the first supporting section 33 is arranged below the second supporting section 34. Additionally or alternatively, the first supporting section 33 and the second supporting section 34 may be bonded to the edge portion 18 of the side wall 16 and to the opposite portion 18a of the side wall 16 at the respective bracing positions.

The embodiment of the cargo carrier 2 as shown in FIGS. 1 to 13 comprises an add-on portion 4 that is attached to the base 10 and to the lid 20, wherein an aerodynamically efficient design is provided, particularly demonstrated with respect to the substantially flush transitions and passages T1 to T8 and silhouettes S1 and S2. Further to aerodynamics, an efficient cargo carrier 2 manufacturing assembly for an efficient manufacturing of the cargo carrier 2 is provided accordingly.

Figure 14:
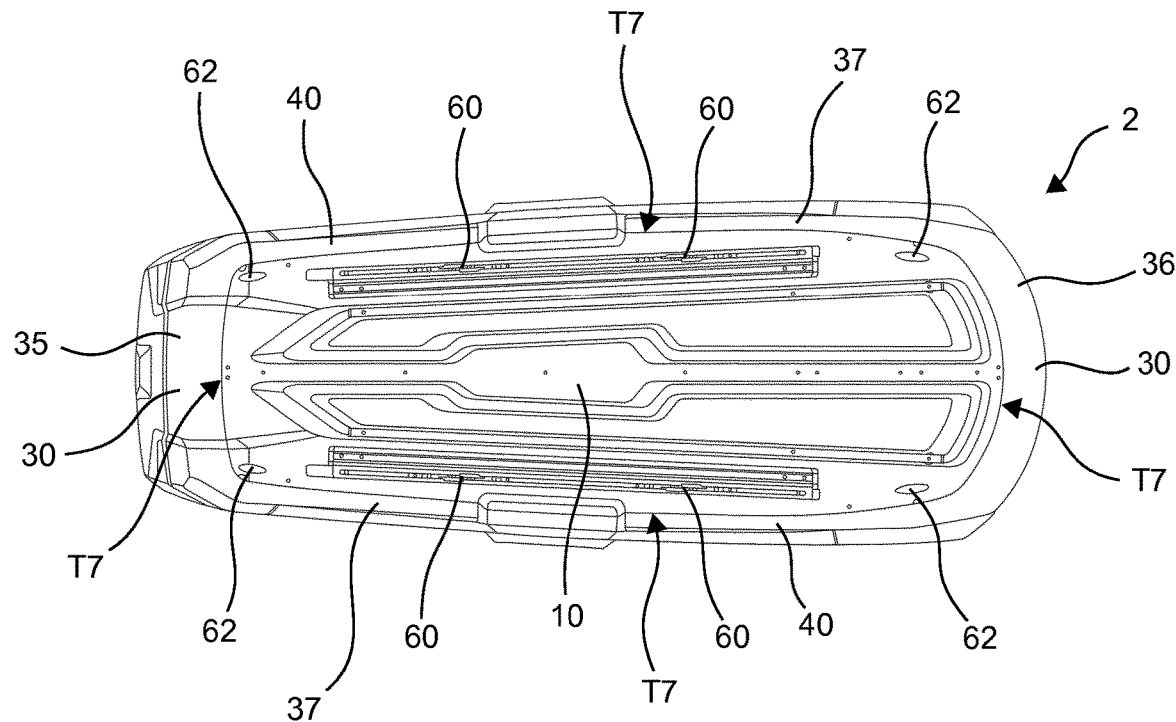
FIG. 14 shows the cargo carrier of FIG. 1 from below.

In FIG. 14, an underside of the cargo carrier 2 is shown from below. Two left ground contact sections 62 are arranged substantially in alignment with two left fixation members 60, wherein the two left fixation members 60 are positioned between the two left ground contact sections 62. Two right ground contact sections 62 are arranged substantially in alignment with two right fixation members 60, wherein the two right fixation members 60 are positioned between the two right ground contact sections 62. Both, the ground contact sections 62 and the fixation members 60 are arranged on the base 10.

The distance between two rear ground contact sections 62 arranged at a rear portion of the base 10 is greater compared to the distance between two front ground contact sections 62 arranged at a front portion of the base 10. The four ground contact sections 62 together with the fixation members 60 are thus arranged trapezoidal on the underside of the base 10. At an intersection of the base 10 with the bridging portion 30 and the frame 40, respectively, the flush transition T7 is formed between the front bridging portion 35, the rear bridging portion 36 and each of the lateral bridging portions 37 and the base 10.

Figure 15:
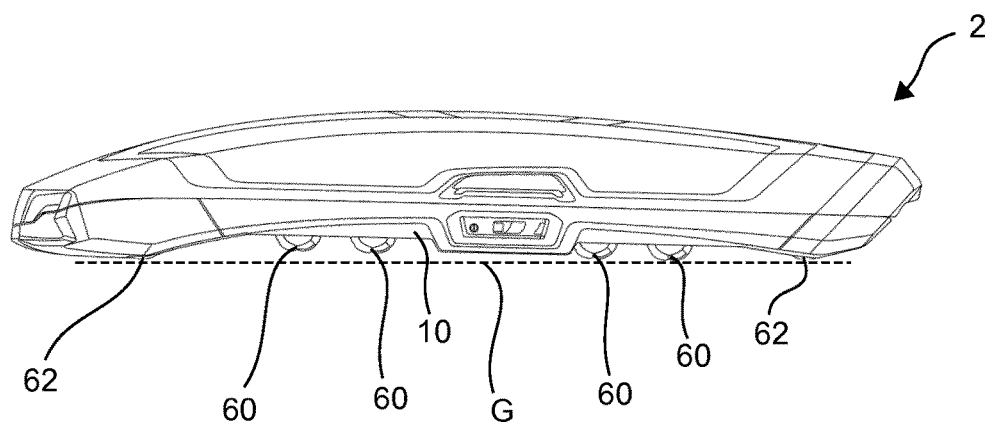
FIG. 15 shows the cargo carrier of FIG. 1 resting on a ground.

In FIG. 15, the cargo carrier 2 is shown in a side view from the left resting on a ground G. The ground G is indicated by a dashed line. While resting on the ground G, the undermost ground contact sections 62 contact the ground G pointwise (two of them are shown in FIG. 15). Regarding the fixation members 60 (four of them are shown in FIG. 15), they do not contact the ground G as they are positioned above the undermost ground contact sections 62.

Figure 16:
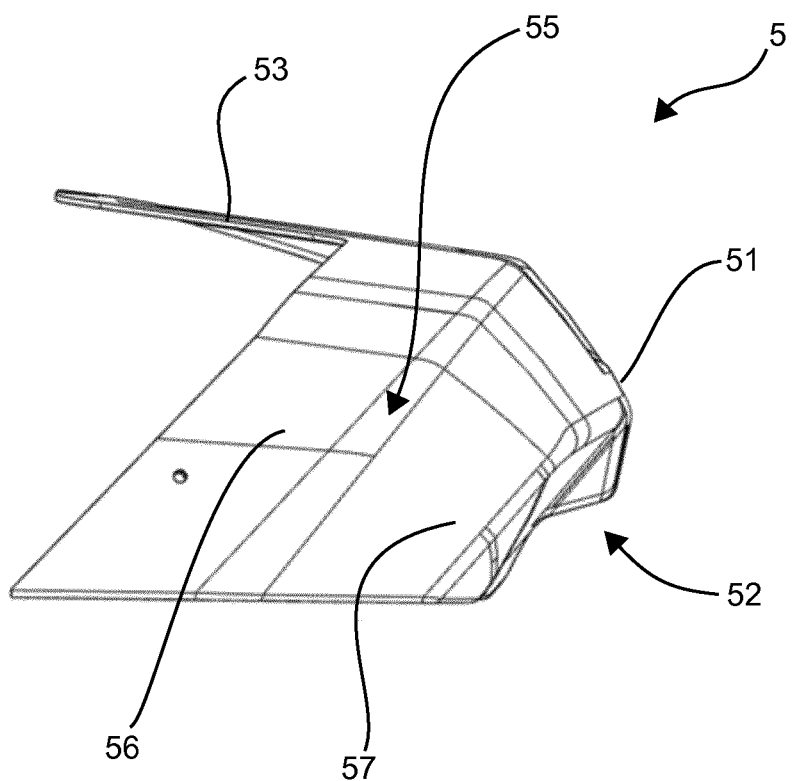
FIG. 16 shows a rear spoiler in a side view.
Figure 17:
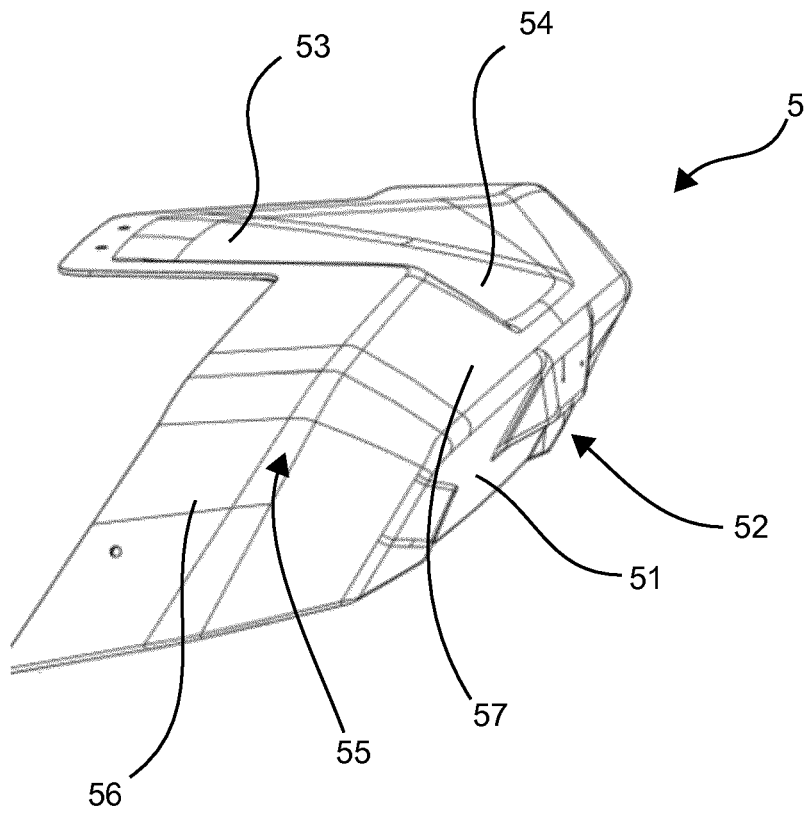
FIG. 17 shows the rear spoiler of FIG. 14 in a perspective view from above.

In FIGS. 16 and 17 a rear spoiler 5 is shown in an isolated manner. The rear spoiler 5 may be identical with the spoiler portion 50 as described. All features described with respect to the spoiler portion 50 may thus also apply to the rear spoiler 5.

An outer surface 51 of the rear spoiler 5 comprises a gripping portion 52 for providing a spoiler handle. The rear spoiler further comprises a spoiler attachment portion 53 for adding the rear spoiler 5 to a lid of a cargo carrier (not shown in FIGS. 16 and 17). The rear spoiler 5 further comprise a depression 54 (only shown in FIG. 17) being substantially flush with the gripping portion 52. Furthermore, the rear spoiler comprises a tapering 55 from a front portion 56 of the rear spoiler 5 to a rear portion 57 of the rear spoiler 5. Such a tapered design has the aerodynamic effect of less air turbulences occurring around the spoiler 5.

Figure 18:
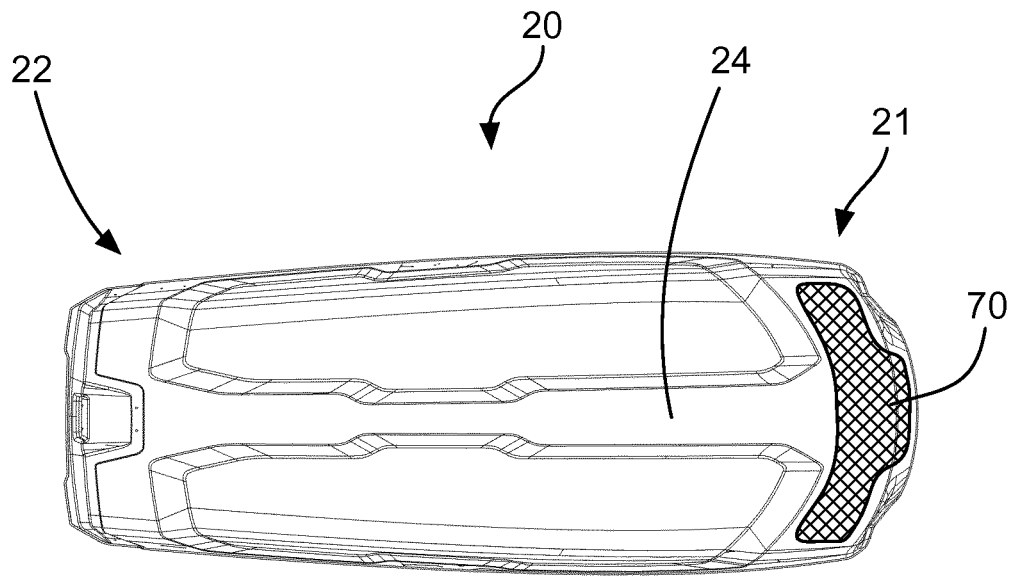
FIG. 18 shows a lid comprising a reinforced front portion according to an embodiment in a bottom view.
Figure 19:
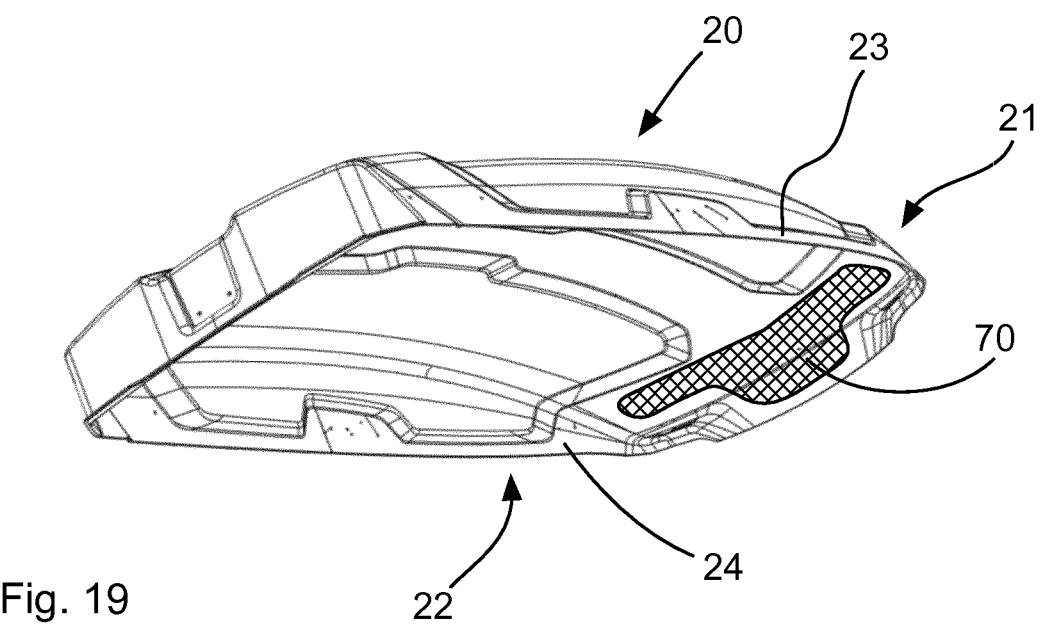
FIG. 19 shows the lid shown in FIG. 18 in a perspective view.

In FIGS. 18 and 19, a lid 20 according to an embodiment is shown from below and in perspective from below, respectively. The lid may be generally used for cargo carriers and may in particular be used for a cargo carrier as described before, preferably a cargo carrier with an add-on portion. The lid 20 comprises a front portion 21 and a rear portion as well as an inner surface 24. In the front portion 21, a reinforcing structure 70 is provided on the inner surface 24.

As is already indicated in FIGS. 18 and 19, the reinforcing structure 70 extends substantially over the entire width of the inner surface 24 of the lid 20 and extends partially downwards towards an edge portion 22 of said lid 20 in the front portion 21 and preferably also in lateral portions of the lid. Accordingly, the reinforcing portion 70 according to this embodiment not only reinforces a top inner wall of the lid 20 but also a side inner wall extending from the top inner wall downwards. However, the reinforcement of the side wall is optional and a reinforcement of the top inner wall can be sufficient.

Although not shown in FIGS. 18 and 19, the reinforcing structure 70 is located at least at a longitudinal forward position of a foremost lateral portion at which hinges for coupling the lid to the base may be attached to the lid 20. However, a portion of the reinforcing structure 70 may also be located at a longitudinal rear position of the foremost lateral portion at which hinges for coupling the lid to the base may be attached to the lid 20 which adds additional stability in the region of the hinge attachments.

The reinforcing structure 70 comprises continuous elongate reinforcing sections 72, 73 wherein at least two of the continuous elongate reinforcing sections 72, 73 comprise different main extension directions. In all the embodiments shown in the Figures, the continuous elongate reinforcing sections 72, 73 are arranged such that one of them crosses another one. The continuous elongate reinforcing sections 72, 73 can thus form different patterns which create additional stability when applied to the front portion 21 of the lid. Furthermore, although not indicated in some of the Figures, the continuous elongate reinforcing sections 72, 73 preferably extend over substantially the entire width of the lid.

According to the embodiments of the Figures, the continuous elongate reinforcing sections 72, 73 are embodied as protrusions formed on or in a sheet 71 which is manufactured according to the dimensions of the front portion 21 of a lid 20 to which it is mounted. The protrusions may be created by directly and integrally forming a sheet 71 with the protrusions, for example by forming ribs on the sheet 71, or by forming a sheet 71 with grooves on one side resulting in protrusions on the opposite side. Such a sheet may be manufactured by moulding plastics.

In FIGS. 20 to 24, different possible patterns formed by the continuous elongate reinforcing section 72, 73 are shown.

Figure 20:
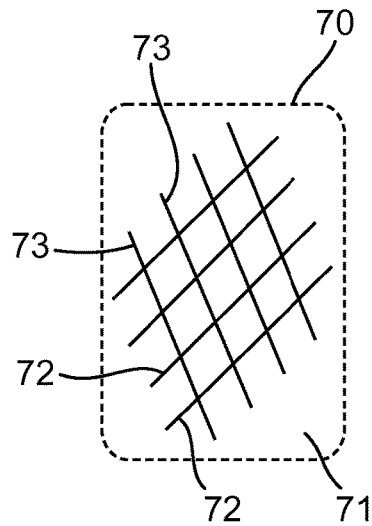
FIG. 20 shows a configuration of a reinforcing structure attachable to the front portion of the lid.

In FIG. 20, a mesh-like structure is shown in which a first group of elongate reinforcing sections 72 are formed straight and parallel with respect to each other and a second group of elongate reinforcing sections 73 are formed straight and parallel with respect to each other but extend at an angle with respect to the first group of elongate reinforcing sections 72. In the embodiment, the elongate reinforcing sections 72, 73 are arranged such that one or more rhombic areas are formed between four of the elongate reinforcing sections. Such a reinforcing structure provides enhanced rigidity as the elongate reinforcing sections 72, 73 extend over the sheet in an unbroken, continuous manner and the rhombic areas provide contact surfaces by means of which the sheet 71 can be bonded to the inner wall.

Figure 21:
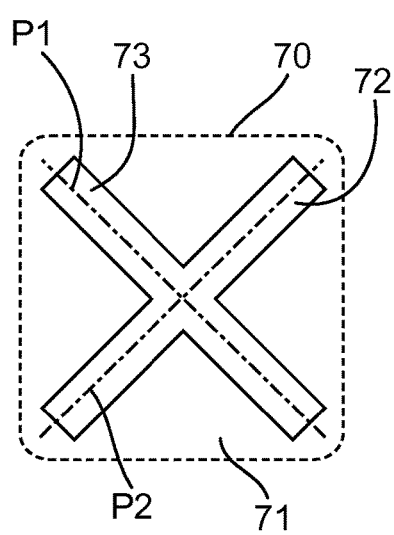
FIG. 21 shows a configuration of an alternative reinforcing structure attachable to the front portion of the lid.

In FIG. 21, a crossing point of two elongate reinforcing sections 72, 73 is shown. The elongate reinforcing sections 72, 73 again cross each other at an angle and both extend along specific paths P1, P2, respectively. In the embodiment, the elongate reinforcing sections 72, 73 meet at an angle of substantially 90 degrees but it is noted that different angles may be realized. As can be gathered from FIG. 21, the elongate reinforcing sections 72, 73 meet each other in a manner that portions of them continue on opposite sides without substantial offset. The course of such elongate reinforcing sections 72, 73 may be referred to as regular, continuous reinforcing sections as they continue on their respective paths P2, P3.

Figure 22:
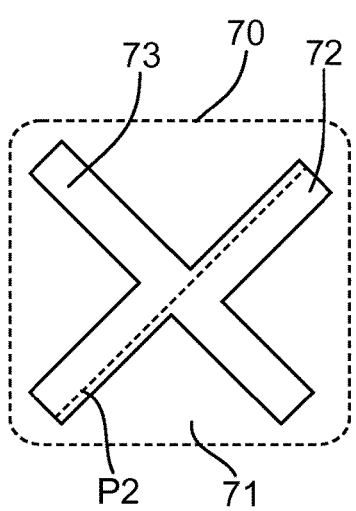
FIG. 22 shows a configuration of a further alternative reinforcing structure attachable to the front portion of the lid.

A slight modification is shown in FIG. 22. Here, the reinforcing section 72 is partially continuous as it continues on a path P2 lying within the width of the reinforcing section 72 as is indicated. In other words, there is a slight offset in the portions on opposite sides of the reinforcing section 73 that is crossed, but not to an extent that the portions do not overlap any more. For example, a configuration in which the offset of portions of one elongate reinforcing section on opposite sides of a reinforcing section which is crossed is such that the one of the portions is not at least partially located in a region limited by two imaginary extensions of lateral outer portions through the crossed elongate reinforcing section, such a configuration of an elongate reinforcing section may be regarded as not continuous. Accordingly, while the configuration as shown in FIG. 22 is still regarded to have a continuous reinforcing section 72 a further offset between the portions on opposite sides would lead to a non-continuous configuration.

Figure 23:
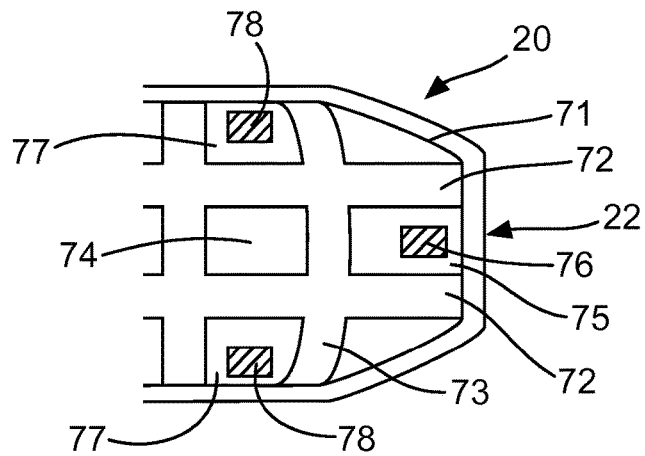
FIG. 23 shows a front portion of the lid provided with a further alternative reinforcing structure attached thereon.

FIG. 23 shows an arrangement in which elongate reinforcing sections 72, 73 are arranged cross to each other in a sheet 71. More precisely, in the configuration according to FIG. 23, two elongate reinforcing sections 72 extend substantially parallel in the longitudinal direction and at substantially the same distance from a middle axis of the lid 20. The two longitudinal reinforcing sections 72 extend up to the front end of the lid and partially downwards along an inner side wall surface of the lid 20. A transversal reinforcing section 73 crossing both of the longitudinal reinforcing sections 72 is provided at a predetermined distance from the front end of the lid 20. The transversal reinforcing section 73 is continuous and unbroken over substantially the entire width of the lid. The transversal reinforcing section 73 comprises a curved shape in which a middle portion is nearer to the front end of the lid compared to the end portions thereof. An area 75 limited by the front end portions of the longitudinal elongate reinforcing sections 72 and a forward end portion of a middle section of the curved transversal elongate reinforcing section 73 may be used for an attachment of a lid lifter and may thus form a fixation area 75 having a support portion 76 formed by a double layer of sheet 71 and lid wall. On a rear side of the transversal elongate reinforcing section 73 similar areas at least partially limited by the elongate reinforcing sections may serve as fixation portions 74 for bonding the sheet 71 to the inner wall 24 of the lid 20 or may serves as fixation areas 77 which in addition to being bondable to the lid 20 may serve as fixation areas defining a support portion 78 configured for an attachment of lateral foremost hinges of the lid 20. Instead of or in addition to a curved transversal elongate reinforcing section 73, a straight transversal elongate reinforcing section may be provided.

Figure 24:
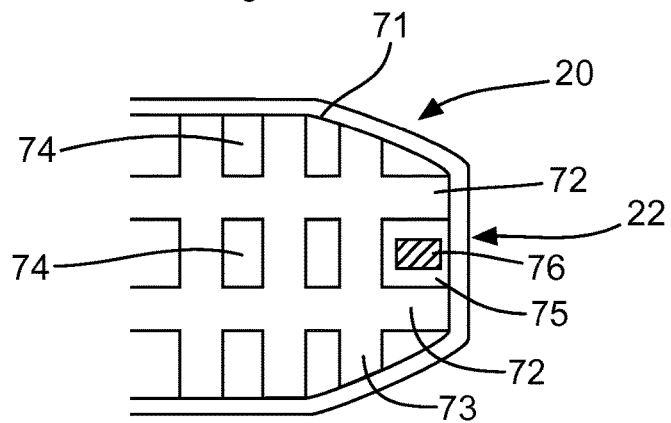
FIG. 24 shows a front portion of the lid provided with another alternative reinforcing structure attached thereon.

FIG. 24 shows a configuration in which instead of the curved transversal elongate reinforcing section, multiple straight transversal reinforcing sections 73 are provided. Again, suitable areas 74, 75 as described before are created between the elongate longitudinal and transversal reinforcing sections 72, 73.

Figure 25:
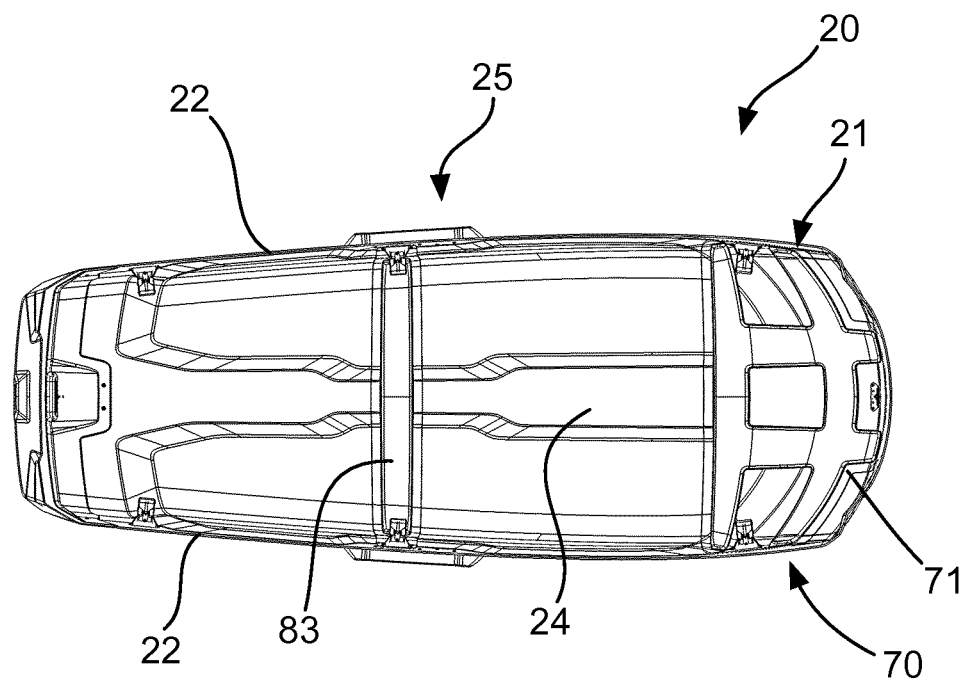
FIG. 25 shows the lid comprising a reinforcement front portion according to a further alternative embodiment provided with a further alternative reinforcing structure attached thereon in a bottom view.

In FIG. 25, the lid 20 is shown from below. In the lid 20, a reinforcing structure 70 is provided on the inner surface 24 of the lid 20. The further reinforcing structure 70 may be configured, at least in part, as the reinforcing structure 70 described with respect to FIGS. 18 to 24. The further reinforcing structure 70 extends substantially over the entire width of the inner surface 24 of the lid 20. The reinforcing structure 70 extends partially downwards towards the edge portion 22 of the lid 20 in the front portion 21 and preferably also rearwards towards a middle portion 25 of the lid 20.

The lid 20 can comprise an additional reinforcing structure 83 attachable to the middle portion 25 of the lid 20, for example in the area at which middle hinges for coupling the lid to a base can be provided. The reinforcing structure 70 and the additional reinforcing structure 83 are separate parts. The additional reinforcing structure 83 laterally extends over the entire width of the inner surface 24 of the lid 20, wherein the additional reinforcing structure 83 may interconnect the edge portion 22 of the lid 20 providing an enhanced overall stability of the lid 20. The additional reinforcing structure 83 may be at least partly configured as one of the described transversal reinforcing sections 73 of one of the described reinforcing structures 70.

Figure 26:
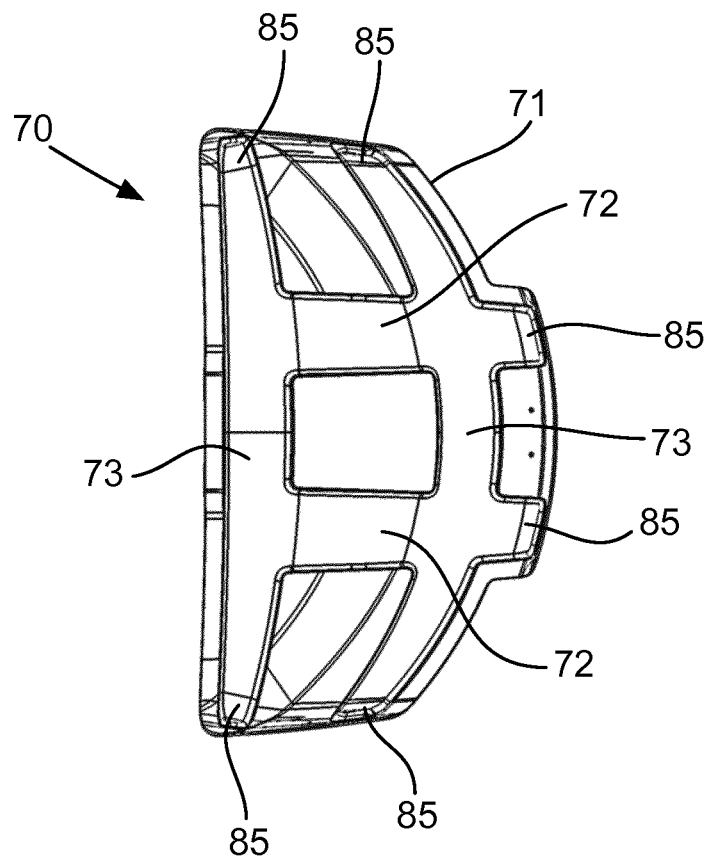
FIG. 26 shows the reinforcing structure of FIG. 25 in a bottom view.
Figure 27:
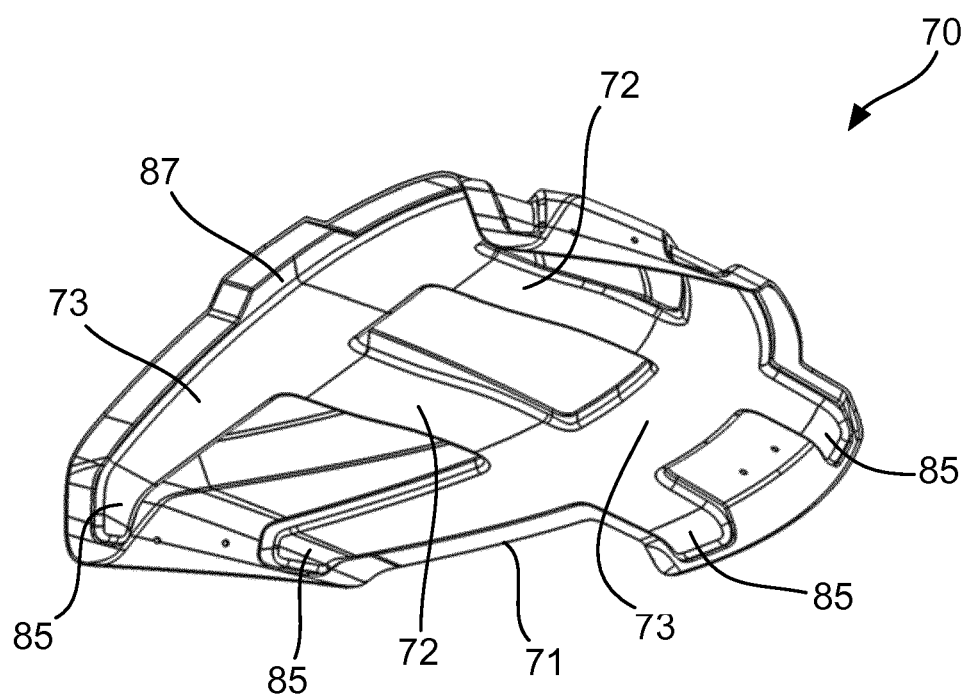
FIG. 27 shows the reinforcing structure of FIG. 25 in a perspective view.

In FIGS. 26 and 27, the reinforcing structure 70 is shown from below. Also the reinforcing structure 70 comprises continuous elongate reinforcing sections 72, 73 forming another pattern creating additional stability similar to the pattern shown in FIG. 23, wherein the elongate reinforcing sections 72, 73 are arranged flush with each other towards the rear of the reinforcing structure 70. The reinforcing structure 70 comprises a mesh-like structure, in which a first group of elongate reinforcing sections 72 are formed straight and parallel with respect to each other and a second group of elongate reinforcing sections 73 are formed in a curved manner and not necessarily parallel with respect to each other but extend at an angle with respect to the first group of elongate reinforcing sections 72. Besides the above said with respect to FIG. 26, the continuous elongate reinforcing sections 72, 73 of the reinforcing structure 70 may be configured, at least in part, as the continuous elongate reinforcing sections 72, 73 described with respect to FIGS. 18 to 24. Thus, the continuous elongate reinforcing sections 72, 73 may be embodied as protrusions formed on or in the sheet 71 described there.

FIGS. 26 and 27 show an arrangement in which the elongate reinforcing sections 72, 73 are arranged cross to each other in the sheet 71. In the configuration according to FIGS. 26 and 27, two elongate reinforcing sections 72 extend substantially parallel in the longitudinal direction and at substantially the same distance from the middle axis of the lid 20. Both of the two longitudinal reinforcing sections 72 extend up to the front end of the lid and partially downwards along the inner side wall surface of the lid 20 up to a transversal reinforcing section 73, wherein the two longitudinal reinforcing sections 72 may terminate flush with the transversal reinforcing section 73. The transversal reinforcing section 73 may not be curved in the longitudinal direction. The transversal reinforcing section 73 may however be tapered in the longitudinal direction and/or in the cross direction. A further transversal reinforcing section 73 crossing both of the longitudinal reinforcing sections 72 may be provided at a predetermined distance from the front end of the lid 20. The further transversal reinforcing section 73 may be provided in between the front end of the lid 20 and the transversal reinforcing section 73 that may be flush with the two elongate reinforcing sections 72. The transversal reinforcing section 73 comprises a curved shape in which a middle portion is nearer to the front end of the lid 20 compared to the end portions thereof. At least one of the transversal reinforcing sections 73 of the arrangement is continuous and unbroken over substantially the entire width of the lid. The area 75 (not shown in FIGS. 26 and 27) described with respect to FIGS. 23 and 24 may also be provided according to this arrangement. The same applies to the areas described with respect to FIGS. 23 and 24 serving as fixation portions 74 for bonding the sheet 71 to the inner wall 24 of the lid 20 or serving as fixation areas 77 defining a support portion 78.

As shown in FIGS. 25 to 27, the elongate reinforcing sections 72, 73 may further comprise curved end portions 85, which may at least in part geometrically follow the shape of the edge portion 22 of the lid 20 in its front end and/or in its lateral sides. Furthermore at least one of the elongate reinforcing sections 72, 73 may further comprise at least one bulging portion 87 shown in FIG. 27, following the shape of the inner surface 24 of the lid 20. The bulging portion 87 may partly scale up the thickness of the at least one of the elongate reinforcing sections 72, 73 by adding an additional bulging volume to a constant thickness of the at least one of the elongate reinforcing sections 72, 73.

Common to all the latter embodiments is the manufacturing process of the lid 20 comprising the reinforcing structure 70. First, a lid for a cargo carrier is provided and a reinforcing structure 70 comprising elongate reinforcing sections 72, 73 are provided. For that, the elongate reinforcing sections 72, 73 are formed in a separate sheet 71. In the present embodiment, the sheet 71 and the elongate reinforcing sections 72, 73 are integrally moulded from resin moulding, in particular by forming protrusions on the sheet.

The thus created reinforcing structure 70 comprising the sheet 71 with integrally formed reinforcing sections 72, 73 is then attached, preferably bonded by gluing, to the inner wall of the lid 20 at a front portion of the lid 20. It is to be noted that due to the fact that the reinforcing structure is created as a separate member and then applied on the lid, existing lids can be retrofitted by attaching such reinforcing structures thereto.

In the following, a possible first configuration of a cargo carrier and a second configuration of a lid which may be used with a cargo carrier, in particular with a cargo carrier according to the first configuration and/or as described before in the summary portion and the detailed description are represented in itemized structure in addition to the subject matter of the claims. Basically, each single feature of each configuration may be combined with each single feature described with respect to the cargo carrier according to the invention, or vice versa.

Each itemized structure comprises an item 1 and further items that each may refer to each of the preceding items. It is to be noted that the below specific feature combinations are not intended to limit the disclosure to such specific feature combinations. By contrast, the below feature combinations merely provide different examples of cargo carriers and lids having improved capabilities. Those capabilities may be suitably combined among each other, i.e. at least one feature from at least one item may be combined with at least one other feature of all other items.

FIRST CONFIGURATION

1. Cargo carrier (2), in particular rooftop cargo carrier, comprising a base (10) having a trough shape with an interior space (11) for stowing goods to be transported therein;
an openable and closable lid (20) hingedly coupled with said base (10);
fixation members (60) for fixing the cargo carrier (2) to a vehicle, preferably cross bar attachment clamps or claws for attaching the cargo carrier (2) to cross bars on said vehicle;
an add-on portion (4) attached to at least one of said base (10) and said lid (20) for enlarging the overall external volume of the cargo carrier (2);
said base (10) and/or said add-on portion (4) comprising at least two ground contact sections (62) for supporting the cargo carrier (2) on a substantially level ground and for protecting said fixation members (60).

2. Cargo carrier (2), in particular rooftop cargo carrier, comprising a base (10) having a trough shape with an interior space (11) for stowing goods to be transported therein;
an openable and closable lid (20) hingedly coupled with said base (10);
fixation members (60) for fixing the cargo carrier (2) to a vehicle, preferably cross bar attachment clamps or claws for attaching the cargo carrier (2) to cross bars on said vehicle;
said base (10) comprising at least two ground contact sections (62) for supporting the cargo carrier (2) on a substantially level ground and for protecting said fixation members (60).

3. Cargo carrier (2) according to one of the preceding items,
when positioned on a vehicle roof, said fixation members (60) are aerodynamically shielded by said at least two ground contact sections (62).

4. Cargo carrier (2) according to one of the preceding items,
said fixation members (60) being arranged within a convex hull (7) enveloping said base (10), said lid (20) and/or said add-on portion (4).

5. Cargo carrier (2) according to one of the preceding items,
an underside of the cargo carrier (2) having a concavely curved shape, wherein said base (10) and/or said add-on portion (4) preferably have a curved shape.

6. Cargo carrier (2) according to one of the preceding items,
said at least two ground contact sections (62) being aligned with said fixation members (60).

7. Cargo carrier (2) according to one of the preceding items, comprising
four ground contact sections (62) comprising two left ground contact sections (62) and two right ground contact sections (62); and
four fixation members (60) comprising two left fixation members (60) and two right fixation members (60);
said two left ground contact sections (62) are arranged substantially in alignment with said two left fixation members (60); and
said two right ground contact sections (62) are arranged substantially in alignment with said two right fixation members (60).

8. Cargo carrier (2) according to one of the preceding items,
said fixation members (60) being movable for yielding when being in contact with said ground.

9. Cargo carrier (2) according to one of the preceding items, comprising
at least three ground contact sections (62);
at least three ground contact sections (62) of said at least three ground contact sections (62) being preferably substantially point-type contact sections 10. Cargo carrier (2) according to one of the preceding items,
wherein at least one ground contact section (62) of said at least two ground contact sections (62) is a substantially line-type contact section.

11. Cargo carrier (2) according to one of the preceding items, wherein
said interior space (11) is accessible through an upper opening defined by a rim portion (12) of said base (10);
said openable and closable lid (20) is adapted to be positioned in a closed state with an edge portion (22) of said lid (20) contacting said rim portion (12); and
said add-on portion (4) comprises a bridging portion (30) attached to said base (10) or to said lid (20) and being formed to provide a transition between said edge portion (22) of said lid (20), preferably an outer surface (23) of said edge portion (22) of said lid (20), and said rim portion (12) of said base (10), when said lid (20) is in said closed state;
wherein ground contact sections (62) of said at least two ground contact sections (62) are arranged on said bridging portion (30), preferably two ground contact sections (62) are arranged on a front bridging portion (35) and two ground contact sections (62) are arranged on a rear bridging portion (36).

12. Cargo carrier (2) according to one of the preceding items,
wherein ground contact sections (62) of said at least two ground contact sections (62) are arranged on said base (10);
wherein a distance between two rear ground contact sections (62) arranged at a rear portion of said base (10) is greater compared to a distance between two front ground contact sections (62) arranged at a front portion of said base (10).

SECOND CONFIGURATION

1. Lid (20) for a cargo carrier (2), in particular a rooftop cargo carrier (2), comprising a reinforced front portion (21) for reducing a flexibility of said lid (20) at least in said reinforced front portion (21), said reinforced front portion (21) comprising a reinforcing structure (70), said reinforcing structure (70) comprising at least two continuous elongate reinforcing sections (72, 73), each of said at least two continuous elongate reinforcing sections (72, 73) extending along or being defined in an inner surface (24) of the lid (20) and comprising different main extension directions, wherein said at least two continuous elongate reinforcing sections (72, 73) cross each other and/or wherein preferably each of said at least two continuous elongate reinforcing sections (72, 73) extends along a path (P1, P2) defined by a differentiable function.

2. Lid (20) according to item 1, wherein a first reinforcing section (72) of said at least two continuous elongate reinforcing sections (72, 73) extends in a first direction, preferably in a longitudinal direction of the lid (20), and wherein a second reinforcing section (73) of said at least two continuous elongate reinforcing sections (72, 73) extends cross to said first reinforcing section (72), preferably transversally to said longitudinal direction.

3. Lid (20) according to one of the preceding items, e.g. item 2, wherein at least one of said elongate reinforcing sections (72, 73) is curved, wherein preferably at least one of second reinforcing sections (73) is curved, preferably such that a middle portion thereof is bulged towards a forward end of said lid (20).

4. Lid (20) according to one of the preceding items, e.g. according to item 2 or item 3, wherein at least one of said elongate reinforcing sections (72, 73) is straight, wherein preferably at least one of said first reinforcing sections (72) is straight.

5. Lid (20) according to one of the preceding items, wherein said reinforcing sections (72, 73) are arranged in a frame-like pattern or a mesh-like manner and are alternatively or in addition integrally formed with each other so as to form a unitary member.

6. Lid (20) according to one of the preceding items, wherein said reinforcing sections (72, 73) are formed as ribs, protrusions, channels, grooves or tubes.

7. Lid (20) according to one of the preceding items, wherein said reinforcing structure (70) comprises a support sheet (71), said support sheet (71) being a separate member fixable on an inner surface (24) of said lid (20).

8. Lid (20) according to one of the preceding items, e.g. item 7, wherein said continuous elongate reinforcing sections (72, 73) are formed on or in said support sheet (71), preferably by deforming said support sheet (71) or by integrally moulding said support sheet (71) with said continuous elongate reinforcing sections.

9. Lid (20) according to one of the preceding items, e.g. according to item 7 or item 8, wherein said support sheet (71) is a single, unbroken sheet, preferably comprising a shape which covers the whole inner surface of the lid in the front portion except at corner portions of the lid.

10. Lid (20) according to one of the preceding items, e.g. according to one of items 7 to 9, wherein at least some areas (74) of the sheet (71) between the reinforcing sections (72, 73) are formed as fixation portions (74) configured to get in surface contact with said inner surface (24) of said front portion (21) of said lid (20), said fixation portions (74) being preferably fixed to said lid (20) by means of attachment means such as rivets or being preferably bonded to said lid (20) preferably by gluing.

11. Lid (20) according to one of the preceding items, e.g. according to one of items 7 to 10, wherein an area of the sheet (71) between the reinforcing sections (72, 73) is formed as fixation area (75) with a support portion (76) configured for an attachment of a lid lifter.

12. Lid (20) according to one of the preceding items, e.g. according to one of items 7 to 11, wherein an area of the sheet (71) on a lateral side of the lid (20) is formed as fixation area (77) with a support portion (78) configured for an attachment of a lateral foremost hinge of said lid (20).

13. Lid (20) according to one of the preceding items, e.g. according to one of items 7 to 12, wherein said sheet (71) comprises a dimension and shape allowing it to be attached to the lid in a manner such that it not only covers an inner top wall portion of the front portion (21) of the lid (20) but also extends at least partially downwards along an inner side wall of the lid (20) continuing from the inner top wall.

14. Cargo carrier (2) comprising a base (10) for supporting goods to be transported, and a lid (20) according to one of the preceding items, said lid (20) being hingedly coupled to said base (10).

15. Method for manufacturing a lid (20) according to one of items 1 to 14, comprising the steps of providing a reinforcing structure (70) comprising at least two continuous elongate reinforcing sections (72, 73), preferably by moulding, and attaching said reinforcing structure (70) on a front portion of said lid (20) so as to create a reinforced front portion (21).

REFERENCE SIGNS 2 cargo carrier
4 add-on portion
5 rear spoiler
6 convex hull of base and lid
7 convex hull of base, lid and add-on portion
9 bottom edge portion
10 base
11 interior space
12 rim portion
13 outer surface of rim portion
14 outer surface of side wall
15 lower outer surface of base
16 side wall of base
17 wall portion of side wall
18 edge portion of side wall
18a opposite portion
19 gap
20 lid
21 front portion
22 edge portion of lid
23 outer surface of lid
24 inner surface of lid
25 middle portion of lid
30 bridging portion
31 outer surface of bridging portion
32 upper edge portion of bridging portion
33 first supporting section
34 second supporting section
35 front bridging portion
36 rear bridging portion
37 lateral bridging portion
37a upper portion of lateral bridging portion
37b lower portion of lateral bridging portion
38 intermediate section
40 frame
42 handle
44 lock part
45 lock recess
46 lock and hinge mechanism
50 spoiler portion
51 outer surface of spoiler portion
52 gripping portion
53 attachment portion
54 depression
55 tapering
60 fixation members
62 ground contact sections
70 reinforcing structure
71 support sheet
72 continuous elongate reinforcing section
73 continuous elongate reinforcing section
74 fixation portion
75 fixation area
76 support portion
77 fixation area
78 support portion
83 additional reinforcing structure 85 curved end portions
87 bulging portion
G ground
S1 longitudinal silhouette
S2 cross silhouette
T1 first flush transition
T2 second flush transition
T3 third flush transition
T4 flush passage
T5 flush passage
T6 sixth flush transition
T7 seventh flush transition
T8 flush edge transition

The invention claimed is:

1. A rooftop cargo carrier, comprising:
   a base having a trough shape with an interior space for stowing goods to be transported therein;
   an openable and closable lid hingedly coupled with said base; and
   an add-on portion that at least partially extends outside of said base and said lid when said lid is in a closed state,
   wherein said add-on portion is attached to at least one of said base and said lid for enlarging an overall external volume of the cargo carrier,
   wherein said add-on portion is added to an outer surface of at least one of said base and said lid, and
   wherein said add-on portion comprises a bridging portion that provides a transition between said outer surface of said lid and said outer surface of said base when said lid is in said closed state.

2. The rooftop cargo carrier according to claim 1, wherein:
   said interior space is accessible through an upper opening defined by a rim portion of said base,
   said openable and closable lid is adapted to be positioned in said closed state with an edge portion of said lid contacting said rim portion, and
   said bridging portion provides a transition between said edge portion of said lid and said rim portion of said base, when said lid is in said closed state.

3. The rooftop cargo carrier according to claim 2, wherein said rim portion comprises a U-shape,
   wherein in said rim portion a wall portion of a side wall of said base is curved outward and over onto itself such that an edge portion of said side wall protrudes downwards, and
   wherein a gap is formed between the downwardly protruding edge portion and a portion of said side wall of said base.

4. The rooftop cargo carrier according to claim 1, wherein said bridging portion provides a flush transition between an outer surface of said bridging portion and said outer surface of said lid or between the outer surface of said bridging portion and said outer surface of said base when said lid is in said closed state.

5. The rooftop cargo carrier according to claim 1, wherein said bridging portion comprises a frame surrounding said base.

6. The rooftop cargo carrier according to claim 1, further comprising fixation members for fixing the rooftop cargo carrier to a vehicle.

7. The rooftop cargo carrier according to claim 1, wherein said bridging portion provides a flush transition between an outer surface of said bridging portion and said outer surface of said lid, and between the outer surface of said bridging portion and said outer surface of said base when said lid is in said closed state.

8. The rooftop cargo carrier according to claim 1, wherein said add-on portion comprises a spoiler portion attached to said lid.

9. The rooftop cargo carrier according to claim 8, wherein said spoiler portion comprises a gripping portion for handling the cargo carrier.

10. The rooftop cargo carrier according to claim 8, wherein said spoiler portion provides a flush transition between an outer surface of said spoiler portion and an outer surface of said bridging portion.

11. The rooftop cargo carrier according to claim 10, wherein said base or said add-on portion comprises at least two ground contact sections for supporting the cargo carrier on a substantially level ground.

12. A rooftop cargo carrier, comprising:
    a base having a trough shape with an interior space for stowing goods to be transported therein;
    an openable and closable lid hingedly coupled with said base; and
    an add-on portion attached to at least one of said base and said lid for enlarging an overall external volume of the cargo carrier,
    wherein said interior space is accessible through an upper opening defined by a rim portion of said base,
    wherein said openable and closable lid is adapted to be positioned in a closed state with an edge portion of said lid contacting said rim portion, and
    wherein said add-on portion comprises a bridging portion attached to said base or to said lid and formed to provide a transition between said edge portion of said lid and said rim portion of said base, when said lid is in said closed state.

13. The rooftop cargo carrier according to claim 12, wherein said add-on portion at least partially extends outside of said base and said lid when said lid is in said closed state.

14. The rooftop cargo carrier according to claim 12, wherein said bridging portion provides a flush transition between an outer surface of said bridging portion and the outer surface of said lid or between the outer surface of said bridging portion and the outer surface of said base when said lid is in said closed state.

15. The rooftop cargo carrier according to claim 12, wherein said bridging portion comprises a frame surrounding said base.

16. The rooftop cargo carrier according to claim 12, wherein said rim portion comprises a U-shape,
    wherein in said rim portion a wall portion of a side wall of said base is curved outward and over onto itself such that an edge portion of said side wall protrudes downwards, and
    wherein a gap is formed between the downwardly protruding edge portion and a portion of said side wall of said base.

17. The rooftop cargo carrier according to claim 16, wherein an upper edge portion of said bridging portion is accommodated in said gap.

18. The rooftop cargo carrier according to claim 17, wherein said upper edge portion of said bridging portion comprises two supporting sections being supported oppositely against said wall portions defining said gap.

19. The rooftop cargo carrier according to claim 17, wherein said upper edge portion of said bridging portion is double-curved.

20. The rooftop cargo carrier according to claim 17, wherein said upper edge portion of said bridging portion is bonded to said wall portions defining said gap.

* * * * *